United States Patent [19]
Ichikawa et al.

[11] Patent Number: 5,539,644
[45] Date of Patent: Jul. 23, 1996

[54] SYSTEM FOR DETECTING MISFIRE IN A MULTI-CYLINDER INTERNAL COMBUSTION ENGINE

[75] Inventors: Akira Ichikawa, Chiryu; Kenji Yamamoto, Anjo; Naoyuki Kamiya, Kariya, all of Japan

[73] Assignee: Nippondenso Co., Ltd., Kariya, Japan

[21] Appl. No.: 152,504

[22] Filed: Nov. 16, 1993

[30] Foreign Application Priority Data

Nov. 17, 1992 [JP] Japan .................................. 4-306793
Jun. 22, 1993 [JP] Japan .................................. 5-150152
Jul. 28, 1993 [JP] Japan .................................. 5-185936
Sep. 28, 1993 [JP] Japan .................................. 5-241172
Oct. 13, 1993 [JP] Japan .................................. 5-255583

[51] Int. Cl.$^6$ .............................. G06G 7/70; G01L 3/26; F02P 5/06
[52] U.S. Cl. .............................. 364/431.08; 364/431.07; 364/431.03; 364/431.01; 364/431.04; 73/117.3; 73/118.1; 73/116; 123/630; 123/419; 123/436
[58] Field of Search ................. 364/431.01–431.12; 123/425, 630, 481, 406, 479, 436, 419, 198 DB; 60/277, 275, 276; 73/116, 115, 117.3, 118.1

[56] References Cited

U.S. PATENT DOCUMENTS

| | | | |
|---|---|---|---|
| 5,050,554 | 9/1991 | Ichikawa et al. | 123/419 |
| 5,197,325 | 3/1993 | Tamura et al. | 73/117.3 |
| 5,263,364 | 11/1993 | Nakayama et al. | 364/431.07 |
| 5,263,453 | 11/1993 | Wakahara et al. | 123/436 |
| 5,268,843 | 12/1993 | Imai | 364/431.08 |
| 5,287,282 | 2/1994 | Imai | 364/431.08 |
| 5,287,736 | 2/1994 | Nakayama et al. | 73/116 |
| 5,303,158 | 4/1994 | Kuroda | 364/431.08 |
| 5,357,790 | 10/1994 | Hosoya | 364/431.08 |
| 5,359,882 | 11/1994 | Fukui | 73/117.3 |

FOREIGN PATENT DOCUMENTS

| | | |
|---|---|---|
| 58-19532 | 2/1983 | Japan . |
| 58-51243 | 3/1983 | Japan . |
| 3-246353 | 11/1991 | Japan . |
| 4-72450 | 3/1992 | Japan . |
| 4-194346 | 7/1992 | Japan . |
| 4-198834 | 7/1992 | Japan . |
| 5-10199 | 1/1993 | Japan . |

*Primary Examiner*—Kevin J. Teska
*Assistant Examiner*—Jacques H. Louis-Jacques
*Attorney, Agent, or Firm*—Cushman, Darby & Cushman

[57] ABSTRACT

A misfiring detecting system for an internal combustion engine includes a first misfire determination unit for comparing an engine rotational speed variation amount computed by an engine rotational speed variation amount computing unit, which computes a variation amount of the engine rotational speed, with a misfire determination value set by a misfire determination value setting unit and determines the occurrence of misfiring in the internal combustion engine on the basis of a result of the comparison, and a second misfire determination unit for determining the occurrence of misfiring in the internal combustion engine on the basis of: a result of comparison of a value indicative of a variation between engine rotational speed variation amounts computed by the engine rotational speed variation amount computing unit in the current and immediately preceding cycles, respectively, with a first set value; and a result of comparison of a value indicative of a variation of variation between engine rotational speed variation amounts computed by the engine rotational speed variation amount computing unit in the immediately preceding cycle and that of a two preceding cycle, respectively, with a second set value, so that misfiring can be accurately detected by preventing erroneous misfiring detection.

17 Claims, 24 Drawing Sheets

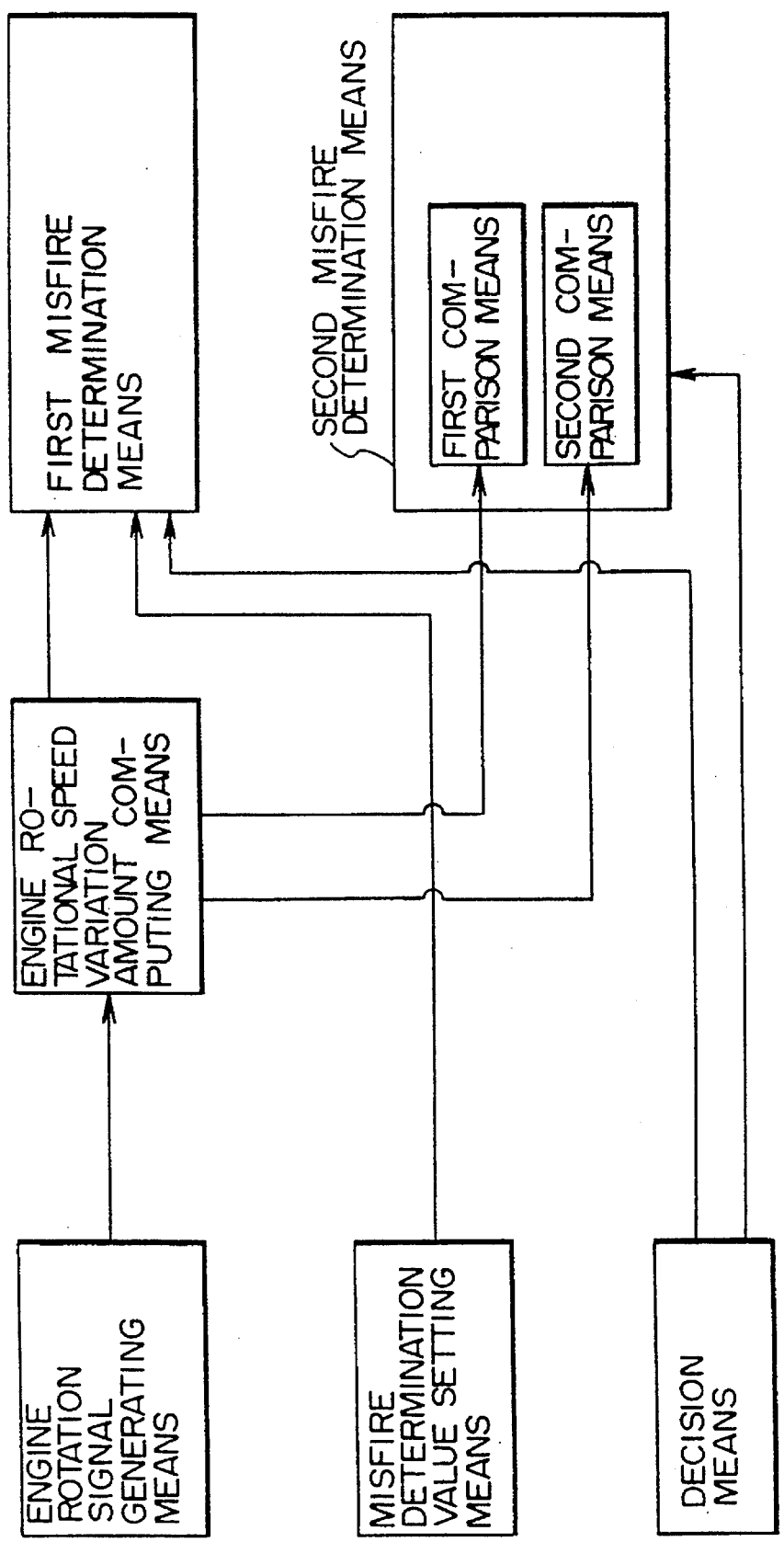

REF MAP

| PM [mmHg] \ NE [rpm] | 500 | 1000 | 1500 | 2000 |
|---|---|---|---|---|
| 160 | REF 11 | REF 12 | REF 13 | REF 14 |
| 260 | REF 21 | REF 22 | REF 23 | REF 24 |
| 360 | REF 31 | REF 32 | REF 33 | |
| 460 | REF 41 | REF 42 | | |

F I G. 13

REF' MAP

| NE [rpm] PM [mmHg] | 500 | 1000 | 1500 | 2000 |
|---|---|---|---|---|
| 160 | REF'11 | REF'12 | REF'13 | REF'14 |
| 260 | REF'21 | REF'22 | REF'23 | REF'24 |
| 360 | REF'31 | REF'32 | REF'33 | |
| 460 | REF'41 | REF'42 | | |

F I G. 14

| | BIT 7 | BIT 6 | BIT 5 | BIT 4 | BIT 3 | BIT 2 | BIT 1 | BIT 0 |
|---|---|---|---|---|---|---|---|---|
| RAM VALUE MFCYL | — | — | #6 | #5 | #4 | #3 | #2 | #1 |

1 CYLINDER $\begin{cases} \Delta\omega > \text{REF} \cdots 1 \\ \Delta\omega \leq \text{REF} \cdots 0 \end{cases}$ F I G. 18
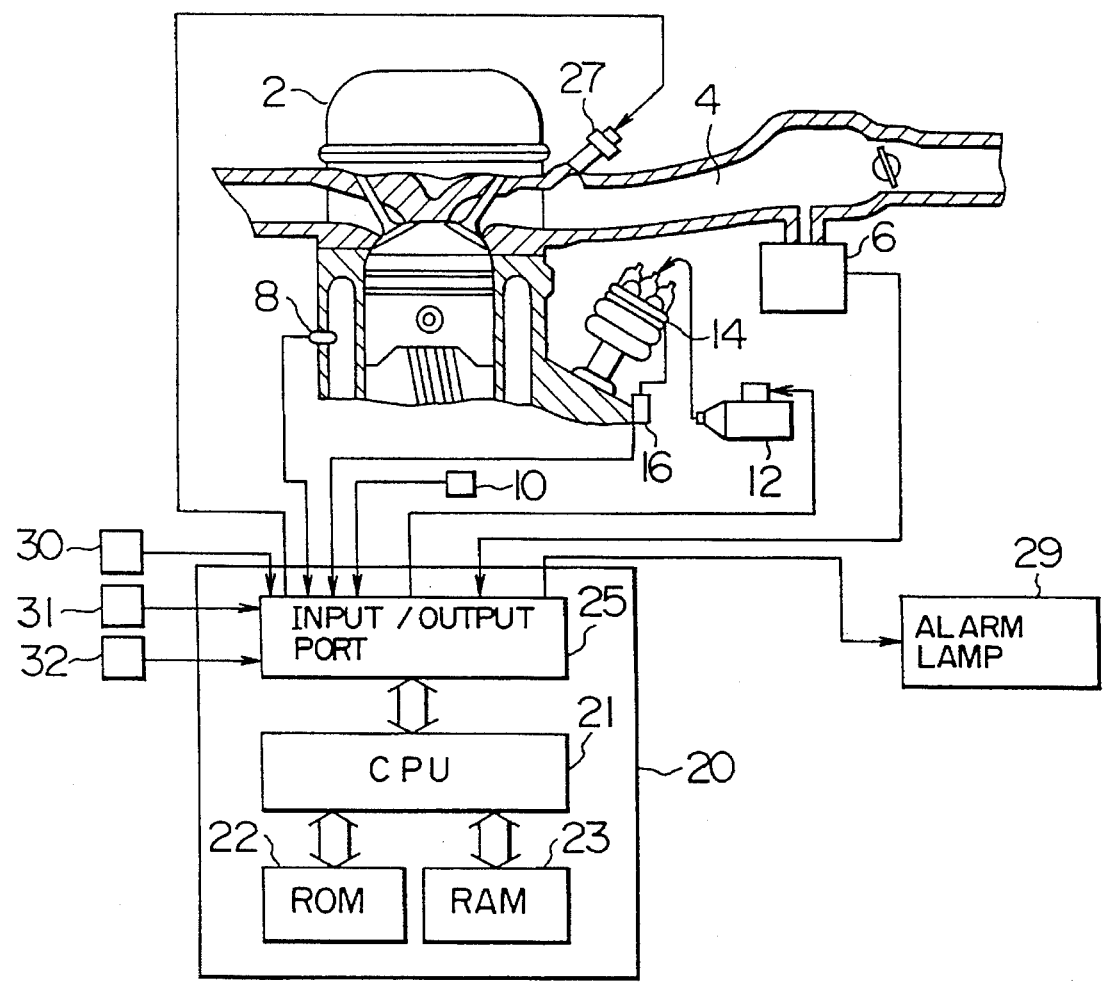

F I G. 19
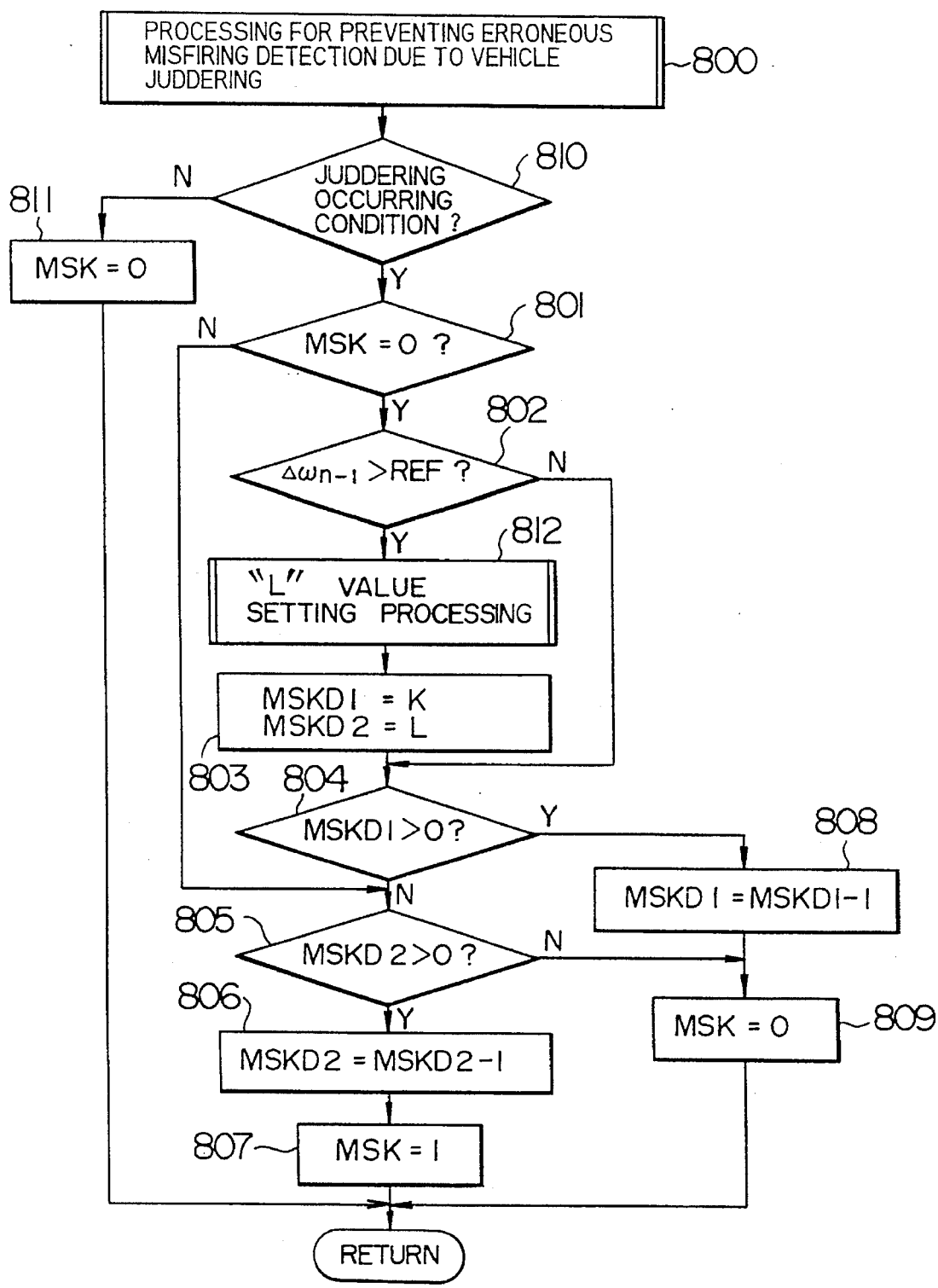

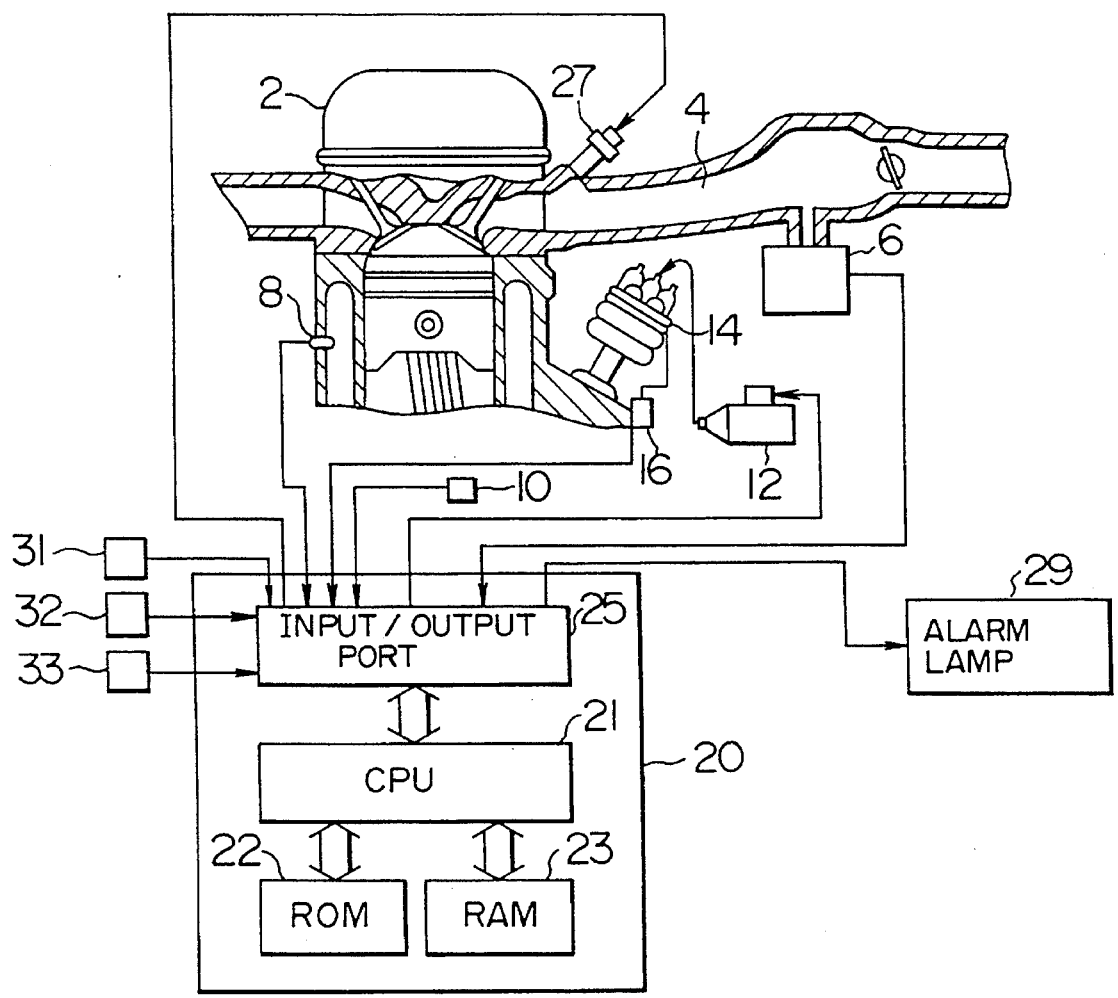
F I G. 26

SYSTEM FOR DETECTING MISFIRE IN A MULTI-CYLINDER INTERNAL COMBUSTION ENGINE

BACKGROUND OF THE INVENTION

The present invention relates to a misfire detecting system for a multi-cylinder internal combustion engine for detecting misfiring on the basis of variation of an engine speed.

Conventionally, a system for detecting misfiring of an internal combustion engine has been known, in which a rotational speed of a crankshaft before and after an expansion stroke of a reciprocal internal combustion engine is detected and misfiring is judged when a rotational speed difference is equal to or less than a set value, as disclosed in JP-A-58-19532. Namely, the rotational speed of the crankshaft differs between an expansion stroke and a compression stroke, and the rotational speed in an expansion stroke is higher than that in a compression stroke when spark ignition takes place normally. By contrast, when misfiring occurs, a difference in the rotational speed between an expansion stroke and a compression stroke is reduced and the rotational speed becomes substantially equal therebetween. On the basis of this fact, misfiring is judged when the rotational speed difference is equal to or less that a predetermined value, namely, when the crankshaft is not accelerated during the expansion stroke.

On the other hand, there is another system for detecting misfiring of the internal combustion engine, in which a predetermined number of engine speed variations are sampled, and a standard deviation is calculated on the basis of the sampled engine speed variations to thereby detect occurrence of misfiring when the standard deviation is large, namely, when the dispersion of the engine speed variations is large (for example, JP-A-58-51243).

However, in the system set forth above, it is possible to make an erroneous determination of misfiring despite the fact that misfiring is not occurring when a vehicle travels on a rough road due to unstable rotation of the crankshaft caused by roughness of the road surface. Namely, on a rough road, a road/tire traction is not uniform, rather it varies significantly due to the roughness of the road surface, as the vehicle bounds and rebounds on the road surface. Variations of the road/tire traction causes fluctuation of a load on the internal combustion engine. For instance, when a load on the engine is increased, the rotational speed of the crankshaft cannot be increased even when the engine is in an expansion stroke where the crankshaft rotational speed should be increased under a normal operating condition. If the crankshaft rotational speed is not increased in an expansion stroke where the crankshaft rotational speed should be increased, variations of the crankshaft rotational speed becomes larger, resulting in larger dispersion of the rotational speed variations. This eventually poses a problem in that the detection of the occurrence of misfiring cannot be achieved accurately.

Here, the transition state of a variation magnitude $\Delta\omega$ of engine speed variations upon the occurrence of one time misfiring when a vehicle is travelling on a smooth road and the transition state of a variation magnitude $\Delta\omega$ of engine speed variations when the vehicle is travelling on a rough road differ from each other, as will be discussed with reference to FIGS. 15A and 15B. In the former case, the ratios of $\Delta\omega$ at the time of occurrence of misfiring to $\Delta\omega$'s before and after the occurrence of misfiring are both large. By contrast, in the latter case, the ratios of $\Delta\omega$ when engine speed variations are caused to occur due to roughness of the road surface to $\Delta\omega$'s before and after the occurrence of the engine speed variations are both small. Accordingly, by checking the magnitude relation of the two ratios, satisfactory accuracy in detecting the occurrence of misfiring can be obtained even when the vehicle is travelling on a rough road.

However, if a case continues where misfiring occurs in a plurality of successively ignited cylinders when checking the magnitude relation of the ratios of $\Delta\omega$ at certain timing with respect to $\Delta\omega$'s before and after that timing, such successive occurrence of misfiring cannot be detected. It is because, if the case continues where misfiring occurs in both of two successively ignited cylinders, for example, the transition state of $\Delta\omega$ becomes as illustrated in FIG. 15C. In this case, among two ratios of $\Delta\omega$ at the occurrence of misfiring to $\Delta\omega$'s before and after the occurrence of misfiring, one ratio becomes small, while the other ratio becomes large. Therefore, misfiring cannot be detected, since both of the two ratios of $\Delta\omega$ are not large.

Furthermore, erroneous determination of misfiring may be caused by juddering of a vehicle following the occurrence of one time misfiring. Here, the juddering of a vehicle is a kind of hunting phenomenon repeating such motions that, when the engine speed variations are reduced by the occurrence of misfiring, the engine is driven by the inertia of the vehicle, as a result, the engine speed is increased as a reaction of a drop it, the engine speed variations, then, as a reaction of a resultant excessive rise of the engine speed, the engine speed decreases again, as shown in FIGS. 10A–10D. This phenomenon is attenuated and the engine speed is stabilized at a certain speed. This juddering is caused only following a final misfire in the case of successive occurrence of misfiring. Once juddering is caused, the engine speed variation magnitude increases during a certain period following the occurrence of misfiring with a possibility of leading to erroneous determination of misfiring.

SUMMARY OF THE INVENTION

In view of the drawbacks set forth above, it is an object of the present invention to provide a misfiring detecting system for an internal combustion engine which can avoid erroneous determination during travelling on a rough road, accurately detects misfiring at the occurrence of sequential misfiring in sequentially ignited cylinders, and accurately detects misfiring avoiding erroneous determination of misfiring even when vehicle juddering is caused by one time misfiring.

According to the first aspect of the invention shown in a functional block diagram of FIG. 1A, a misfiring detecting system for an internal combustion engine comprises: engine rotational signal generating means for outputting an engine rotational signal at every predetermined angle of angular displacement during the rotation of the internal combustion engine; engine rotational speed variation amount computing means for computing an engine rotational speed variation amount per ignition on the basis of the engine rotational signal from the engine rotational signal generating means; misfire determination value setting means for setting a misfire determination value on the basis of an operating condition of the internal combustion engine; decision means for making a decision as to whether an engine speed variation is caused consecutively in the same cylinder of the internal combustion engine; first misfire determination means for determining occurrence of misfiring by comparing the engine rotational speed variation amount computed by the engine rotational speed variation amount computing means with the misfire determination value set by the misfire determination value setting means when the decision means has decided that the engine speed variation is caused consecutively in the same cylinder of the internal combustion engine; and second misfire determination means, including first comparing means for comparing a value calculated in accordance with the engine rotational speed variation amounts computed by the engine rotational speed variation amount computing means in current and immediately preceding cycles, respectively, with a first set value, and second comparing means for comparing a value calculated in accordance with the engine rotational speed variation amounts computed by the engine rotational speed variation amount computing means in an immediately preceding cycles and two preceding cycle, respectively with a second set value, for determining the occurrence of misfiring of the internal combustion engine on the basis of the results of comparison in the first and second comparing means, when the decision means has decided that the engine speed variation is not caused consecutively in the same cylinder of the internal combustion engine.

With the construction of the misfiring detecting system for the internal combustion engine according to the invention, the engine rotational speed variation amount computing means computes the engine rotational speed variation amount per ignition on the basis of the engine rotational signal output from the engine rotational signal generating means.

Then, when the decision means has decided that an engine rotational speed variation is caused in the same cylinder of the internal combustion certainly engine, namely, when misfiring is sequentially caused in the same cylinder, the rotational speed variation amount computed by the engine rotational speed variation amount computing means is compared with the misfire determination value set by the misfire determination value setting means to make a determination of misfiring of the internal combustion engine. Accordingly, even when misfiring is caused in a plurality of sequentially ignited cylinders, misfiring can be detected certainly.

On the other hand, when the decision means has decided that an engine rotational speed variation is not caused sequentially in the same cylinder of the internal combustion engine, misfiring of the internal combustion engine is determined by the second misfire determination means. The second misfire determination means includes first and second comparing means. In the first comparing means, the value calculated by using the engine rotational speed variation amounts computed by the engine rotational speed variation amount computing means in current and immediately preceding cycles is compared with a first set value, and in the second comparing means, the value calculated by using the engine rotational speed variation amounts computed by the engine rotational speed variation amount computing means in an immediately preceding cycles and two preceding cycles is compared with a second set value. Thus, the second misfire determination means makes a determination of misfiring on the basis of the results of comparison by two comparing means. Therefore, when a decision is made by the decision means that an engine rotational speed variation is not caused sequentially in the same cylinder of the internal combustion engine and when either one of the comparing means in the second misfire determination means decides that the value calculated in accordance with two engine rotational speed variation amounts is smaller than the set value, a judgment is made that the vehicle is traveling on a rough road or that misfiring is not occurring.

According to the second aspect of the invention shown in a functional block diagram of FIG. 1B, a misfiring detecting system for an internal combustion engine comprises: engine rotational speed detecting means for detecting a rotational speed of the internal combustion engine; measured value computing means for arithmetically obtaining a measured value by measuring a time period elapsed during an angular displacement between predetermined angular positions in an expansion stroke of each cylinder on the basis of the rotational speed of the internal combustion-engine detected by the engine rotational speed detecting means; first engine rotational speed variation amount computing means for computing a first engine rotational speed variation amount by obtaining a difference between measured values of two cylinders, whose expansion strokes occur sequentially, on the basis of the results of computation by the measured value computing means; second engine rotational speed variation amount computing means for computing a second engine rotational speed variation amount by obtaining a difference between the first engine rotational speed variation amount computed currently by the first engine rotational speed variation amount computing means and the first engine rotational speed variation amount computed precedently on the basis of the information from the engine rotational speed detecting means and the measured value computing means;

misfire detecting means for detecting misfiring of the internal combustion engine on the basis of the first and second engine rotational speed variation amounts; and inhibiting means for inhibiting detection of misfiring by the misfire detecting means for a predetermined period until an influence of an engine rotational speed variation due to a preceding misfire on the detection of a subsequent misfire disappears, upon detection of the occurrence of the preceding misfire by the misfire detecting means.

According to the above-mentioned construction of the misfiring detecting system for the internal combustion engine in accordance with the second aspect of the invention, when a misfire is detected by the misfiring detecting means on the basis of the first engine rotational speed variation amount and the second engine rotational speed variation amount, the inhibiting means inhibits detection of misfiring for a predetermined period until an influence of an engine rotational speed variation due to the occurrence of a misfire on the detection of a subsequent misfire disappears.

BRIEF DESCRIPTION OF THE DRAWINGS

FIG. 1A is a schematic block diagram showing elements in the first aspect of the present invention;

FIG. 13 is an explanatory illustration of a REF' map employed in the first embodiment;

FIG. 14 is an explanatory illustration of a RAM value MFCYL employed in the first embodiment;

FIG. 18 is a schematic block diagram showing the second embodiment when applying the present invention to a 6-cylinder engine;

FIG. 19 is a flowchart of a process of avoiding erroneous misfiring determination due to vehicle juddering, executed by the ECU of the second embodiment;

FIG. 26 is a schematic block diagram showing the construction of the third embodiment of the present invention applied to a 6-cylinder internal combustion engine;

DESCRIPTION OF THE PREFERRED EMBODIMENT

Embodiments of the present invention will be discussed hereinafter with reference to the accompanying drawings.

Figure 2:
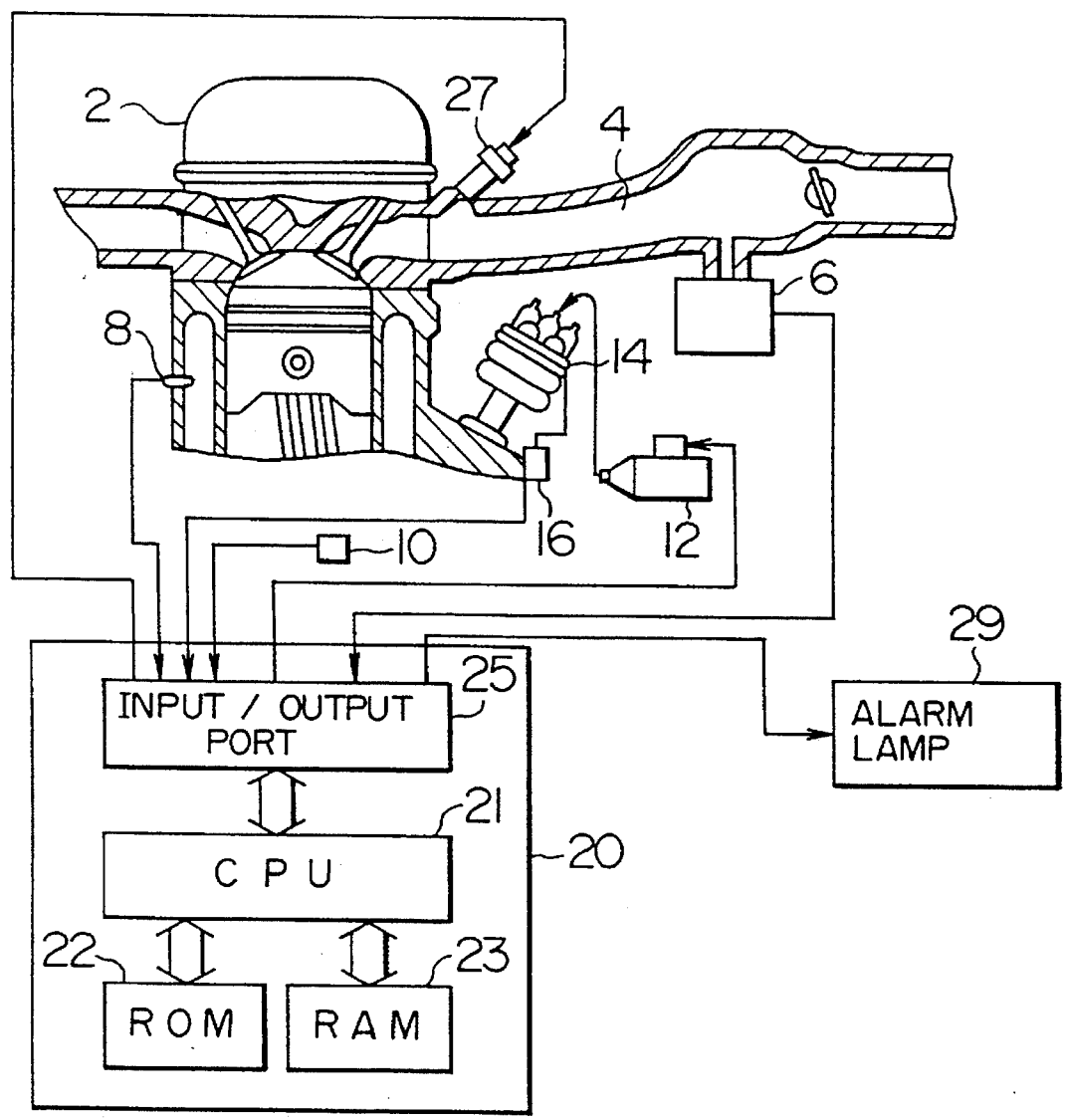
FIG. 2 is a schematic block diagram showing an embodiment employing the present invention for detecting misfiring in a 6-cylinder internal combustion engine.

At first, FIG. 2 is a schematic illustration showing a 6-cylinder internal combustion engine (hereinafter simply referred to as an internal combustion engine) and accessories thereof, to which the present invention is applied.

As shown in FIG. 2, an internal combustion engine 2 has an intake air pressure sensor 6 for measuring a pressure in an air induction pipe 4 (induction pipe pressure), a coolant temperature sensor 8 for measuring a temperature of an engine coolant, a crank angle sensor 10 driven interlinked with the rotation of a crankshaft for generating a pulse signal at every predetermined angular position (30° CA in the shown embodiment) of the rotating engine, and a cylinder discrimination sensor 16 mounted on a distributor 14 for distributing a high voltage generated by an ignitor 12 to not shown ignition coils in respective cylinders of the internal combustion engine 2 for generating a pulse signal once per rotation of the distributor 14 (once per two reciprocating cycles of the internal combustion engine, that is, one engine cycle).

The sensor signals from the foregoing sensors are input to an electronic control unit (ECU) 20. The ECU generally comprises a known microcomputer primarily composed of CPU 21, ROM 22 and RAM 23. The sensor signals are input to the ECU 20 via an input/output port 25.

The CPU 21 performs an engine control process for controlling a fuel injection amount injected from fuel injection valves 27 provided in respective cylinders of the internal combustion engine 2 and a timing of the ignitor 12 to produce a high voltage (namely, spark ignition timing) according to a control program preliminary stored in the ROM 22, and a misfiring determination process for detecting misfiring of the internal combustion engine 2 on the basis of the engine speed in an expansion stroke at each cylinder of the internal combustion engine 2 and turning ON an alarm lamp 29.

The misfiring determination process and a failure diagnosis process for turning ON the alarm lamp 29 depend upon the result of misfiring determination to be performed by the first embodiment of the ECU 20 of the present invention, and will be discussed hereinafter with reference to flowcharts shown in FIGS. 3–9 and 11.

Figure 3:
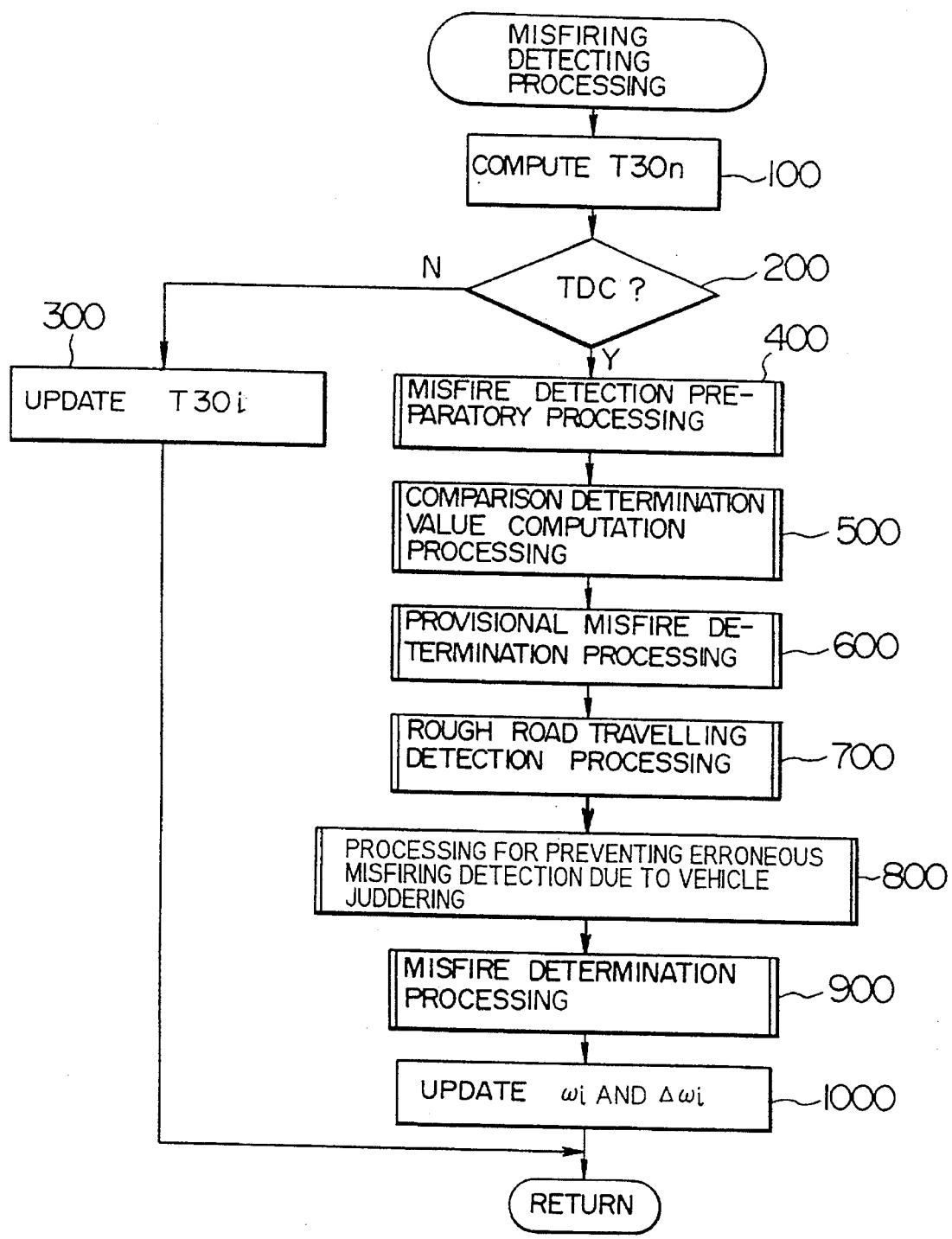
FIG. 3 is a flowchart of a misfiring detecting process executed by an ECU of the first embodiment of the invention.

The misfiring detecting process shown in FIG. 3 is executed by the CPU 21 as an interrupt routine at every predetermined crank angular position (30° CA) of the internal combustion engine 2 by using the output signal of the crank angle sensor 10. When the process of the shown routine is initiated, at first, at a step 100, an elapsed time $T30_n$ taken for a crankshaft angular displacement over 30° CA is computed on the basis of a difference between a preceding interruption timing and the current interruption timing. Then, at a step 200, a check is performed whether any one of the cylinders is currently at a top-dead center (TDC) or not. If no cylinder is at TDC, the process is advanced to a step 300. On the other hand, when one of the cylinders is currently at TDC, the process is advanced to a step 400.

Figure 4:
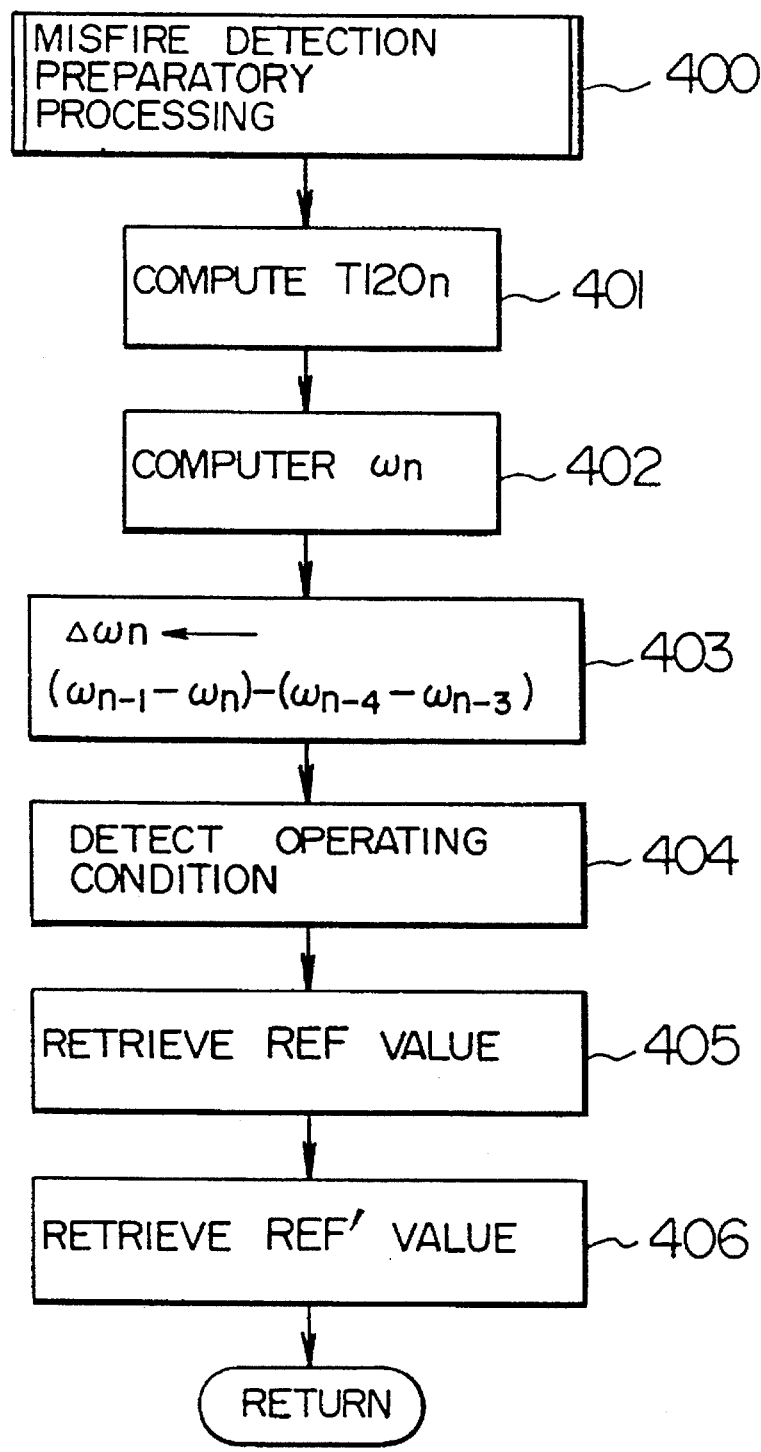
FIG. 4 is a flowchart of a preparatory process for misfiring determination executed by the ECU in the first embodiment.

At the step. 300, as a preliminary stage for deriving a period taken for crankshaft angular displacement over 120° CA of the internal combustion engine at a step 401 in FIG. 4, T30$_i$ $_{(i=n, n-1, n-2)}$ are updated to T30$_{i-1}$ $_{(i=n, n-1, n-2)}$ (namely T30$_{n-1}$ is updated by T30$_n$, T30$_{n-2}$ is updated by T30$_{n-1}$, T30$_{n-3}$ is updated by T30$_{n-2}$). Thereafter, the shown routine ends.

At the step 400, a variation magnitude $\Delta\omega$ of an engine speed variation, a misfiring determination reference REF, and a rough road determination reference REF' are derived before misfiring determination. This process is shown in FIG. 4. Hereinafter, a discussion will be given with reference to FIG. 4.

At first, at the step 401, the period T120$_n$ taken for the crankshaft angular displacement over 120° CA of the internal combustion engine 2 is calculated by summing four data including the period 30T$_n$ taken for the crankshaft angular displacement over 30° CA as derived at the step 100, and T30$_{n-1}$, T30$_{n-2}$ and T30$_{n-3}$ derived in one preceding execution cycle, a two preceding execution cycle and a three preceding execution cycle, respectively. Then, at a step 402, by calculating a reciprocal of the period T120$_n$, an average engine speed $\omega_n$ during revolution over 120° CA of the internal combustion engine is calculated.

Then, at a step 403, on the basis of the currently calculated average engine speed $\omega_n$, and average engine speeds $\omega_{n-1}$, $\omega_{n-3}$ and $\omega_{n-4}$ calculated in the one preceding cycle, the three preceding cycle and the four preceding cycle, the variation magnitude $\Delta\omega$ of the engine speed variation of the internal combustion engine 2 is obtained through the following equation:

$$\Delta\omega=(\omega_{n-1}-\omega_n)-(\omega_{n-4}-\omega_{n-3}) \tag{1}$$

It should be noted that, in the foregoing equation (1), $(\omega_{n-1}-\omega_n)$ and $(\omega_{n-4}-\omega_{n-3})$ are variations of the engine speed with respect to the cylinders whose expansion strokes occur sequentially. $(\omega_{n-1}-\omega_n)$ represents the current engine speed variation and $(\omega_{n-4}-\omega_{n-3})$ represents the engine speed variation at 360° CA before.

Here, in the first embodiment, the internal combustion engine is a 6-cylinder internal combustion engine. Therefore, the expansion stroke period of a cylinder of its own starts at 120° CA before TDC of another cylinder which subsequently enters its expansion stroke period. Therefore, by calculating the average engine speed $\omega_n$ per every 120° CA of the rotating engine, the average engine speeds of the respective cylinders can be derived. Then, a current engine speed variation magnitude is derived from the currently derived average engine speed and the average engine speed derived in the immediately preceding execution cycle. Furthermore, on the basis of the engine speed variation magnitude $\Delta\omega_n$ and the engine speed variation magnitude at 360° CA before, a variation magnitude $\Delta\omega_n$ of the engine speed variation of the internal combustion engine to be used for determination of the misfiring of the internal combustion engine 2 is derived. It should be appreciated that, although the shown embodiment derives the current engine speed variation magnitude and the engine speed variation magnitude at 360° CA before simultaneously, by storing the currently derived engine speed variation magnitude in RAM 23, the variation magnitude $\Delta\omega_n$ can be obtained by simply reading the engine variation magnitude at 360° CA before from the RAM 23 with no calculation thereof.

At a subsequent step 404, an instantaneous engine operating condition (the engine speed NE, the induction pipe pressure PM) is detected. Then, the process is advanced to a step 405. At the step 405, on the basis of the operating condition (the engine speed NE and the induction pipe pressure PM) detected at the step 404, the misfiring determination reference value REF is set by retrieving a two-dimensional map (REF map) shown in FIG. 12 which is preliminarily stored in the ROM 22 taking the engine speed NE and the induction air pressure PM as parameters.

Similarly, at a step 406, a rough road determination reference value REF' is set by retrieving a two-dimensional map REF' map) shown in FIG. 13 taking the engine speed NE and the induction pipe pressure PM as parameters. Then, the shown routine ends and the processing is advanced to a step 500 in FIG. 3.

Figure 17:
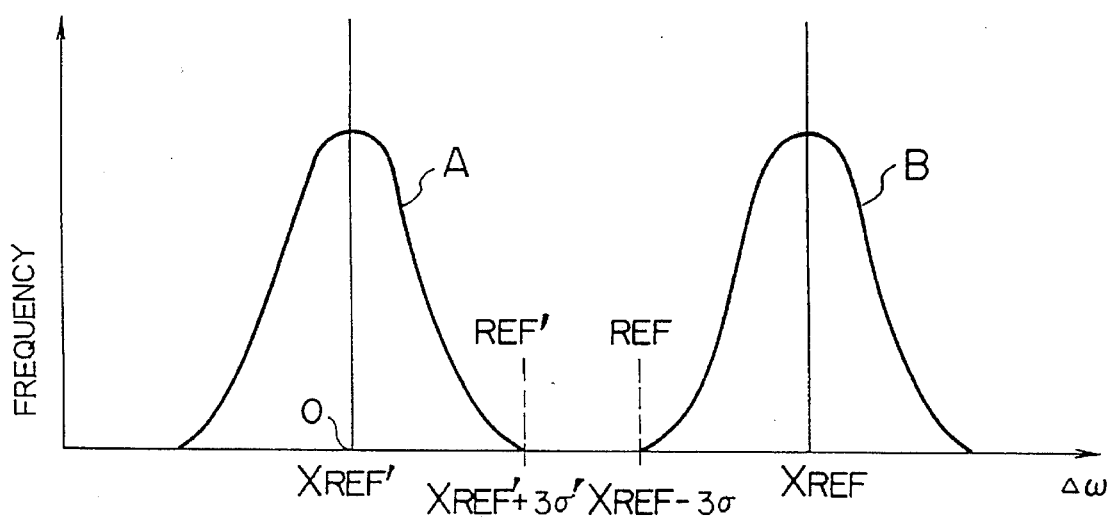
FIG. 17 is a characteristic diagram showing the relationship between the value of $\Delta\omega$ and the frequency of occurrence thereof when misfiring occurrs and in a normal ignition state.

FIG. 17 shows a relationship between the value of $\Delta\omega$ under normal combustion and a frequency of the occurrence thereof (graph A) and a relationship between the value of $\Delta\omega$ at the occurrence of misfiring and a frequency of occurrence thereof (graph B). As can be understood from these illustrations, these show graphs of normal distribution. In the shown first embodiment, as shown in FIG. 18, the map of the misfiring determination reference value REF (shown in FIG. 12) can be derived on the basis of a value set by the following equation by taking an average value of $\Delta\omega$ measured upon the occurrence of misfiring under various engine operating conditions as X$_{REF}$, and a standard deviation as $\sigma$:

$$REF=X_{REF}-3\sigma \tag{2}$$

Similarly, the rough road determination reference value REF' can be derived on the basis of the value set by the following equation by taking an average value of $\Delta\omega$ measured at normal combustion in various engine operating conditions as X$_{REF'}$, and a standard deviation as $\sigma'$:

$$REF'=X_{REF'}+3\sigma' \tag{3}$$

Namely, the misfiring determination reference value REF is set to be at least smaller than the variation magnitude $\Delta\omega$ at the occurrence of misfiring on a smooth road. On the other hand, the rough road determination reference value REF' is set to be at least greater than the variation magnitude $\Delta\omega$ at normal combustion on an even road.

It should be appreciated that although the shown embodiment derives REF and REF' by using mutually independent maps, REF' can be obtained from:

$$REF'=k \times REF (0.45<k<0.55) \tag{4}$$

employing the predetermined value k when a difference between the $\Delta\omega$'s at the occurrence of misfiring and at normal combustion is sufficiently large so as to reduce a memory capacity of the ROM. It should be noted that the value k should not be restricted to be in the above-mentioned range but can be varied any way within a range of 0<k<1.

Next, at a step 500, a comparison determination value computation process is executed. This comparison determination value computation process is a process for calculating a determination value K1 to be used in comparing $\Delta\omega$ of a two preceding cycle with $\Delta\omega$ of the immediate preceding cycle and a determination value K2 to be used in comparing the $\Delta\omega$ of the immediately preceding cycle with $\Delta\omega$ of the current cycle. This process will be discussed with reference to FIG. 5.

At a step 501, the currently calculated $\Delta\omega_n$ derived at the step 403 of FIG. 4 is compared with the misfiring determination reference value REF derived at the step 405 of FIG. 4. Then, if $\Delta\omega_n$ is greater than REF, the process is advanced to a step 502. At the step 502, among respective bits of RAM value MFCYL shown in FIG. 14, a bit corresponding to the engine cylinder for which the current $\Delta\omega_n$ is calculated is set to "1". For instance, when the current $\Delta\omega_n$ is calculated at the ignition of the #1 cylinder, the bit BITO corresponding to the #1 cylinder is set to "1". Then, the process is advanced to a step 504.

On the other hand, when $\Delta\omega_n$ is smaller than REF, the process is advanced to a step 503. At this time, among respective bits of RAM value MFCYL shown in FIG. 4, the bit corresponding to the cylinder for which the current $\Delta\omega_n$ is calculated is set to "0". Thereafter, the process is advanced to the step 504.

At a step 504, a check is performed whether the currently obtained MFCYL(i) obtained through the process of the steps 502 and 503 is the same as the immediately preceding MFCYL(i-1) obtained at the immediately preceding ignition. Namely, a judgment is made as to whether the value of the 6 bits of RAM are the same in the current cycle and the preceding cycle or not, so as to check whether the combustion condition of the cylinder for which $\Delta\omega_n$ is calculated is the same as the combustion condition in the preceding ignition of the same cylinder. Then, when the current MFCYL is the same as the preceding MFCYL, the process is advanced to a step 505 to increment a counter CMFCNT (CMFCNT←CMFCNT+1). Then, the process is advanced to a step 507.

On the other hand, when the current MFCYL and the preceding MFCYL is not the same, the process is advanced to a step 506 to set the counter CMFCNT to "0". Then, the process is advanced to the step 507.

Namely, when the counter CMFCNT is incremented at the step 505, it indicates that the value of the RAM value MFCYL is maintained in the same condition. Namely, at this time, the foregoing represents the same combustion condition of the internal combustion engine 2. For instance, this shows each cylinder of the internal combustion engine 2 is certainly ignited or the condition where the same cylinder continuously causes misfiring is indicated. On the other hand, when the RAM value MFCYL changes and thus the counter CMFCNT is set to "0" at the step 506, it indicates the same combustion condition of the internal combustion engine is not continued.

Then, at the step 507, a judgment is made as to whether the counter CMFCNT is greater than the predetermined value k or not. When the counter CMFCNT is smaller than the predetermined value k, the process is advanced to a step 509 to set the comparison determination values K1 and K2 to first and second set values A and B which are preliminarily set. It should be noted that these first and second set values A and B are selected to have values so as not to degrade detecting performance when one time misfiring is occurred on the smooth road surface. Experimentarily, it has been confirmed that good misfiring detecting performance can be obtained when A and B are both approximately 1.5–2.0.

On the other hand, if the counter CMFCNT is greater than the predetermined value k, the process is advanced to a step 508 to set the comparison determination values K1 and K2 to preliminarily set values a and b. It should be noted that these set values a and b are smaller values than the above-mentioned set values A and B. Illustratively in the first embodiment, they are set to a=b=0.

Through the foregoing process, the comparison determination values K1 and K2 are obtained. Then, the step 500 in the misfiring determination process ends. Then, the process is advanced to a step 600.

At the step 600, a provisional misfiring determination process is performed. Here, provisional misfiring determination is performed. In addition, an incrementing process for a misfiring occurrence integration counter CMIS and a rough road determination integration counter CRAF for making a determination as to whether misfiring condition, which requires a failure indication, is occurring or not at every predetermined number of occurrence of spark ignition. This process will be discussed hereinafter with reference to a flowchart of FIG. 6.

Figure 5:
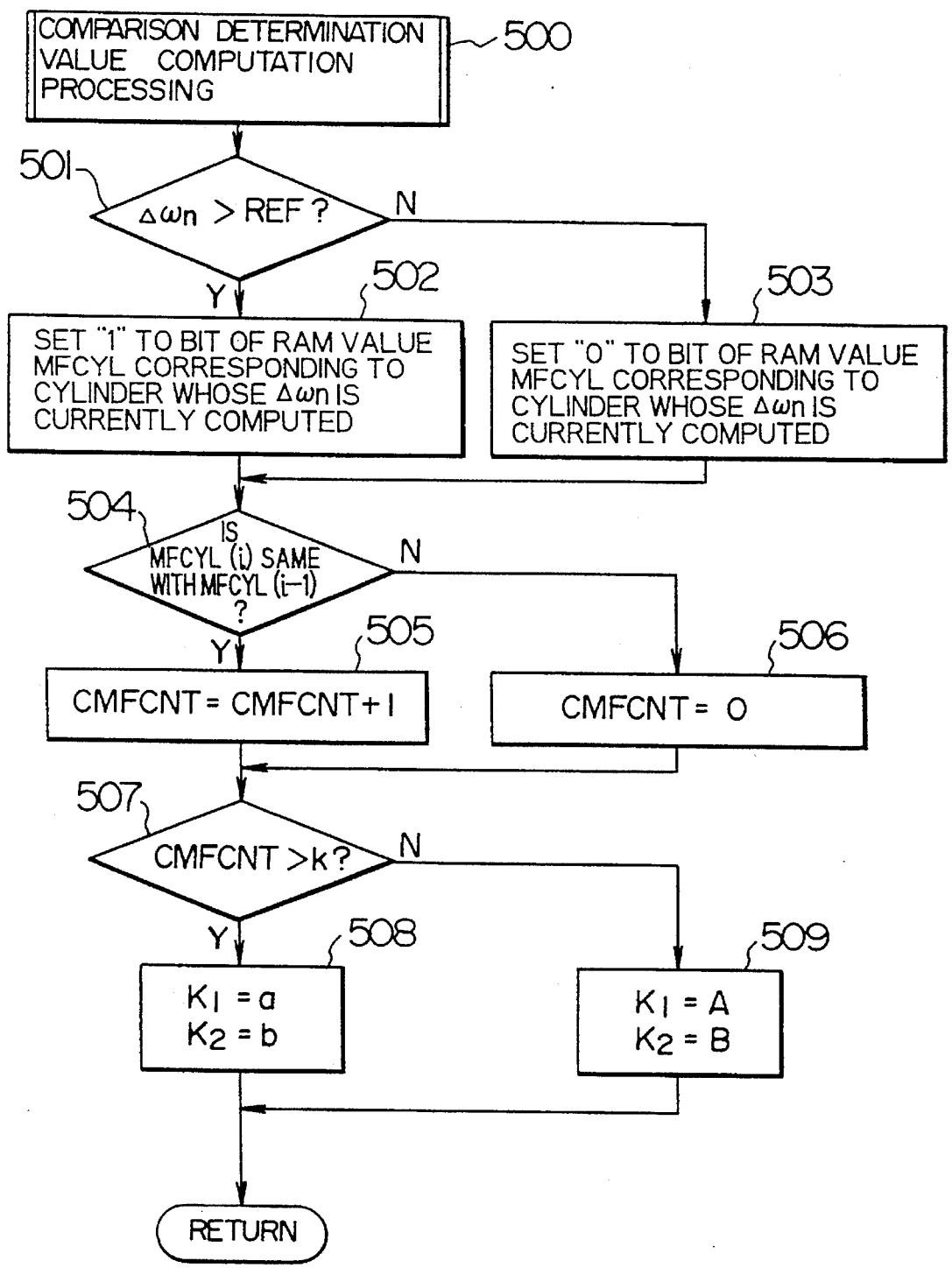
FIG. 5 is a flowchart of a calculating process of obtaining a reference value for comparison, executed by the ECU of the first embodiment.

Initially, at a step 601, $\Delta\omega_{n-1}$ derived at the step of 403 in FIG. 4 in the preceding execution cycle is compared with a value calculated by multiplying $\Delta\omega_{n-2}$ derived in the two preceding execution cycle by the comparison determination value K1 calculated in the comparison determination value computation process of FIG. 5. Namely, a ratio $\Delta\omega_{n-1}/\Delta\omega_{n-2}$ of the variation magnitudes of the engine speed variations in the preceding execution cycle and that of two preceding execution cycle is checked to determine if it is greater than the comparison determination value K1. When $\Delta\omega_{n-1}/\Delta\omega_{n-2}$ is greater than the comparison determination value K1, the process is advanced to a step 602. On the other hand, if $\Delta\omega_{n-1}/\Delta\omega_{n-2}$ is smaller than or equal to the comparison determination value K1, the process is advanced to a step 608.

Furthermore, at the step 602, $\Delta\omega_{n-1}$ is compared with a value derived by multiplying $\Delta\omega_n$ currently derived at the step 403 of FIG. 4 by the comparison determination value K2 derived through the comparison determination value computation process of FIG. 5. Namely, a ratio $\Delta\omega_{n-1}/\Delta\omega_n$ of the variation magnitudes of the engine speed variations in the preceding execution cycle and in the current execution cycle is checked to determine if the ratio is greater than the comparison determination value K2. If $\Delta\omega_{n-1}/\Delta\omega_n$ is greater than the comparison determination value K2, the process is advanced to a step 603. On the other hand, when $\Delta\omega_{n-1}/\Delta\omega_n$ is smaller than the comparison determination value K2, the process is advanced to a step 608. Here, in the manner of comparison as set forth above, it is possible to make a comparison by using a difference of variation magnitude of the engine speed variation instead of the ratio of the variation magnitude of the engine speed variation. In such a case, $\Delta\omega_{n-1} > K1 \times \Delta\omega_{n-2}$ in the step 601 is changed to $\Delta\omega_{n-1} - \Delta\omega_{n-2} > K1$ and $\Delta\omega_{n-1} > K2 \times \Delta\omega_n$ in the step 602 is changed to $\Delta\omega_{n-1} - \Delta\omega_n > K2$.

Then, at the step 603, $\Delta\omega_{n-1}$ derived at the step 403 of FIG. 4 in the immediately preceding execution cycle is compared with REF derived at the step 405. When $\Delta\omega_{n-1}$ is greater than REF, the process is advanced to a step 604 to set a provisional misfiring determination flag $XMF_{n-1}$ to "1". Then, at a step 605, the misfiring occurrence integration counter CMIS is incremented. On the other hand, when $\Delta\omega_{n-1}$ is smaller than REF, the process is advanced to a step 606 to compare $\Delta\omega_{n-1}$ with REF' derived at the step 406. When $\Delta\omega_{n-1}$ is greater than REF', the process is advanced to a step 607 to increment the rough road determination integration counter CRAF. On the other hand, when $\Delta\omega_{n-1}$ is smaller than REF', the process is advanced to a step 608. At the step 608, the provisional misfiring determination flag $XMF_{n-1}$ is set to "0" to determine that the cylinder is normal. Then, the process is advanced to a step 609. At the step 609, an ignition occurrence counter CSKP for determining whether a predetermined number of spark ignition has taken place or not is incremented. Then, the step 600 in FIG. 3 ends.

Figure 7:
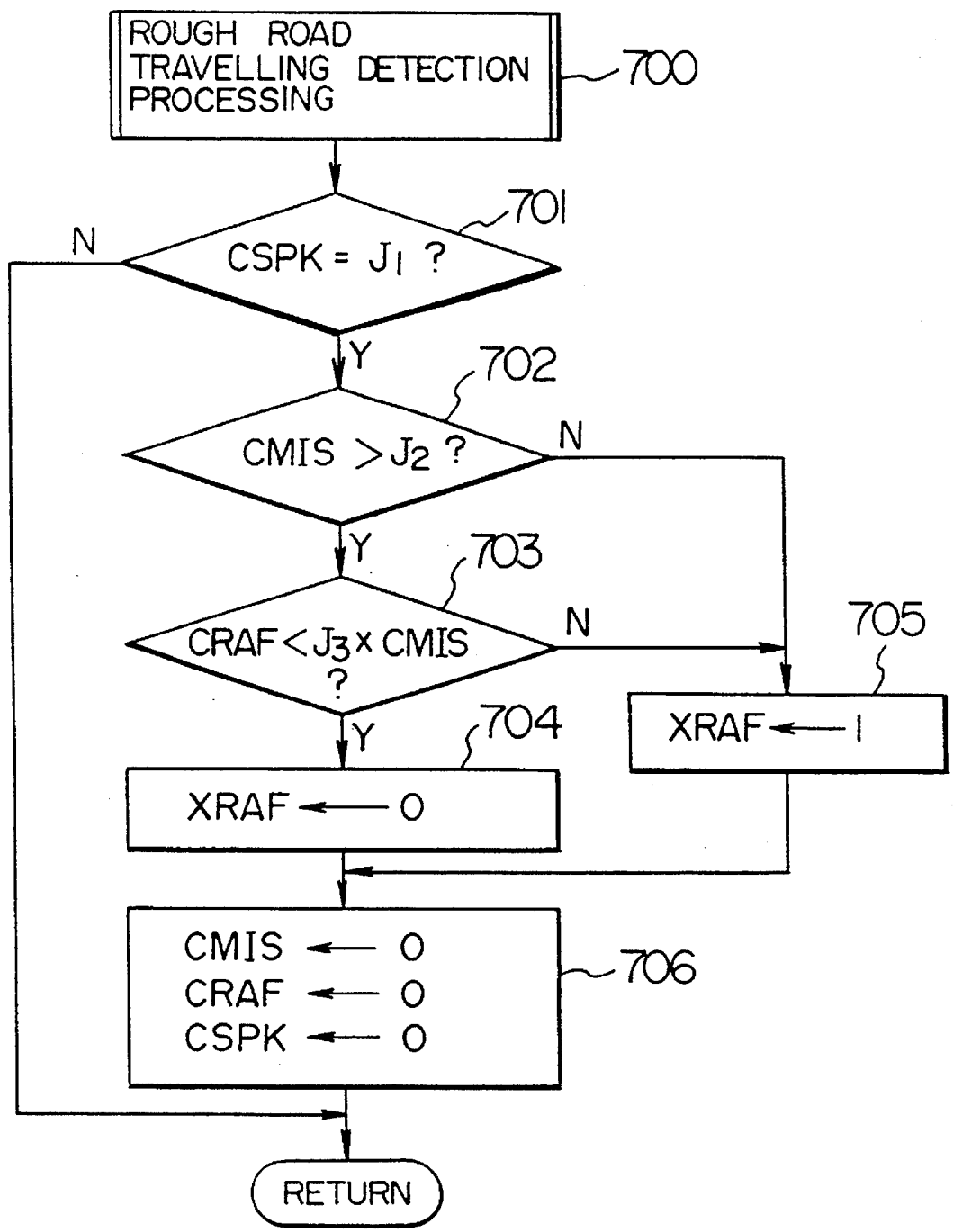
FIG. 7 is a flowchart of a rough road determination process executed by the ECU of the first embodiment.

Returning to FIG. 3, at a step 700, a judgment is made as to whether the vehicle is currently travelling on a rough road. FIG. 7 shows a flowchart of the rough road traveling detection process. The process will be discussed hereinbelow with reference to FIG. 7.

Figure 6:
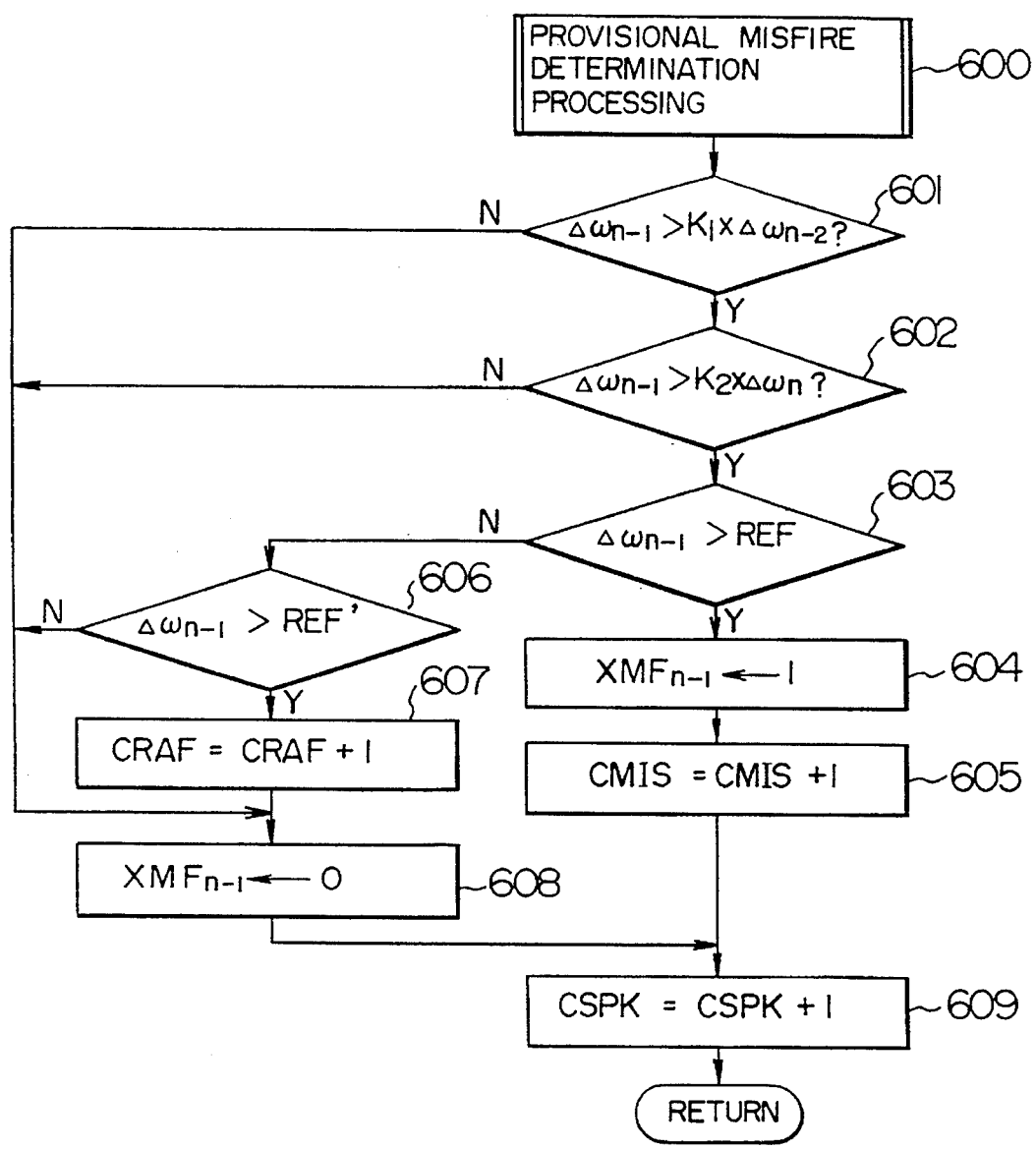
FIG. 6 is a flowchart of a misfiring provisional determination process executed by the ECU of the first embodiment.

In FIG. 7, at a step 701, a check is made as to whether the value of the ignition occurrence counter CSPK incremented at every occurrence of spark ignition at the step 609 of FIG. 6 reaches a predetermined value $J_1$. The predetermined value $J_1$ will be 3000 when failure determination is performed at every 1000 revolutions of the 6-cylinder internal combustion engine. Accordingly, the processes of a step 702 and subsequent steps are performed at every predetermined number of revolutions of the internal combustion engine.

When judgment is made that the count of the ignition occurrence counter CSPK has reached the predetermined value $J_1$ at the step 701, the process is advanced to a step 702 to compare the value of the misfiring occurrence integration counter CMIS with a misfiring condition determination value $J_2$. If the misfiring state to be indicated as a occurrence of failure for every 1000 times of rotation is assumed to be a time when a misfiring occurrence rate exceeds 1%, then $J_2=30$ holds when $J_1=3000$. When the counted value of the misfiring occurrence integration counter CMIS is greater than the predetermined value $J_2$, the process is advanced to a step 703 for rough road determination. On the other hand, when the counted value of the misfiring occurrence integration counter is smaller than the predetermined value $J_2$, then the process is advanced to a step 705.

At the step 703, the counted value of the rough road determination integration counter CRAF is compared with a value derived by multiplying the CMIS value by a rough road determination coefficient $J_3$. The value of $J_3$ is selected to have a value adapted for practical travelling on the rough road which is apt to cause erroneous detection of a misfiring state. For instance, the value will be approximately 1–2. It should be appreciated that though the shown embodiment makes a determination of the rough road by comparing CRAF with CMIS×$J_3$, it can be done by using the other constant, such as $J_2$×$J_3$. At the step 703, if the counted value of the rough read determination integration counter CRAF is smaller than CMIS×$J_3$, judgment is made that the vehicle is not traveling on a rough road. Then, at a step 704, a rough road determination flag XRAF is set to "0". Otherwise, a judgment is made that the vehicle is travelling on a rough road to set the rough road determination flag XRAF to "1" at the step 705.

Next, at a step 706, respective counters CMIS, CRAF, CSPK are cleared to "0". Then, the rough road determination process ends and the process is advanced to a step 800 in FIG. 3.

Figure 8:
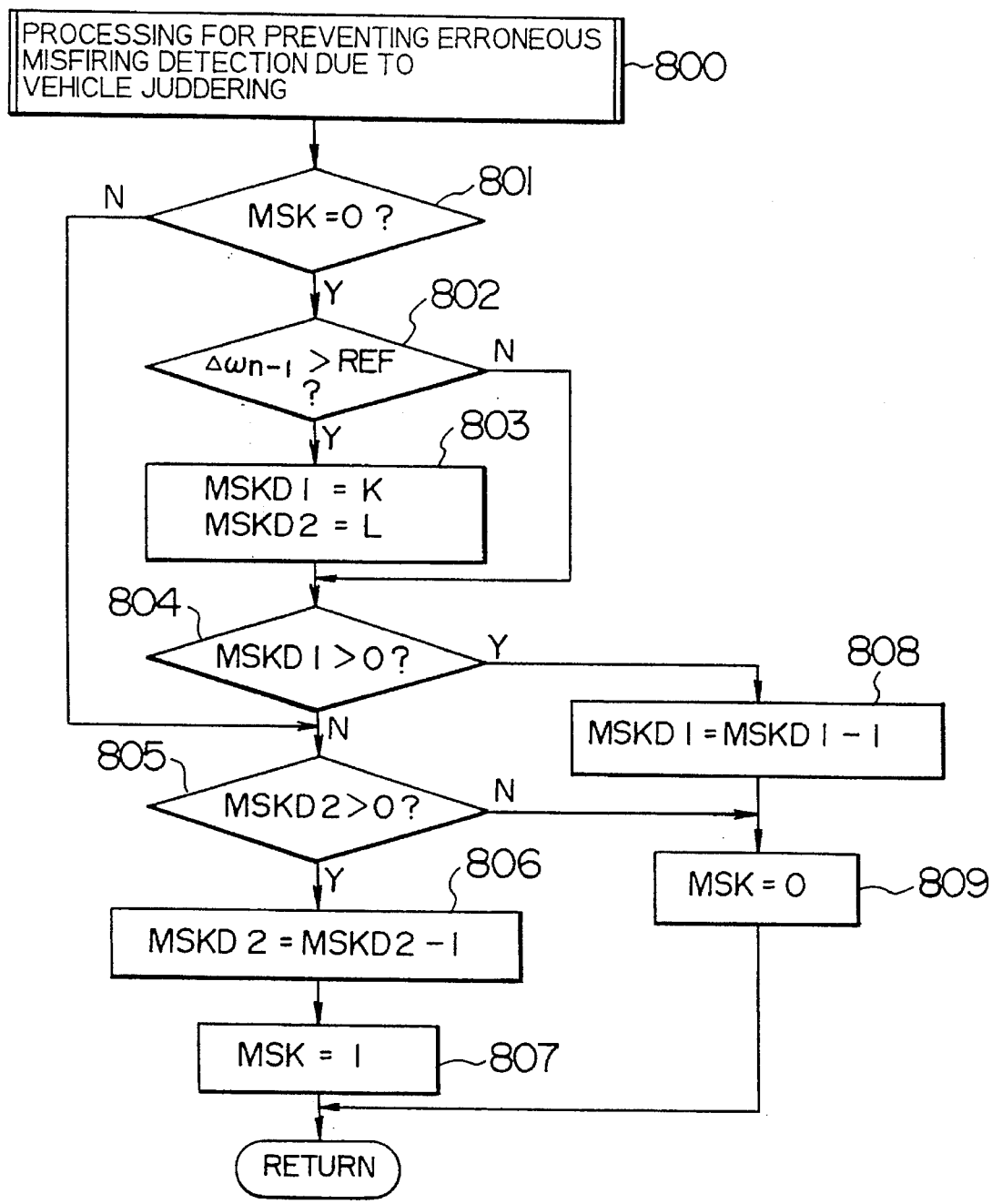
FIG. 8 is a flowchart of a process of avoiding erroneous misfiring determination caused by vehicle juddering, executed by the ECU of the first embodiment.

At the step 800, a process for preventing erroneous detection of misfiring due to vehicle juddering, which process is the principal process in the present invention. FIG. 8 shows a flow chart showing the process for preventing erroneous detection of misfiring due to vehicle juddering.

At first, at a step 801, a check is performed whether a masking carrying out flag MSK is "0" or not. If MSK is "0", the process is advanced to a step 802, and, if MSK is "1", the process is advanced to a step 805. Namely, once the masking carrying out flag MSK is set to "1", the process through steps 802–804 discussed hereinbelow will not be executed.

Next, at a step 802, a check is made as to whether $\Delta\omega_{n-1}$, for which the misfiring determination is currently made, is greater than the misfiring determination reference REF. If $\Delta\omega_{n-1}$ is greater than REF, the process is advanced to the step 803. On the other hand, if $\Delta\omega_{n-1}$ is smaller than or equal to REF, the process is advanced to the step 804. At the step 803, a masking delay counter MSKD1 for calculating a misfiring determination masking period is set to "K" (in the shown embodiment, K="5"), and a masking carrying out counter MSKD2 is set to "L" (in the shown embodiment, L="10"). In the illustrative embodiment, the value of "K" is an experimentarily obtained value so that counting down will end before the occurrence of vehicle juddering. On the other hand, the value of "L" is an experimentarily obtained value of such a magnitude that counting down will end after the influence of vehicle juddering has disappeared.

At a step 804, a check is performed as to whether the masking delay counter MSKD1 is greater than "0" or not. If MSKD1 is greater than "0", the process is advanced to a step 808. On the other hand, if the MSKD1 is smaller than or equal to "0", the process is advanced to a step 805. At the step 808, the masking delay counter MSKD1 is counted down. Then, the process is advanced to a step 809.

At the step 805, check is made as to whether the masking carrying out counter MSKD2 is greater than "0" or not. If MSKD2 is greater than "0", the process is advanced to a step 806, and otherwise, i.e. MSKD2 is smaller than or equal to "0", the process is advanced to the step 809 to set the masking carrying out flag MSK to "0" and then the shown routine ends. On the other hand, at the step 806, the masking carrying out counter MSKD2 is counted down. Then, at a step 807, the masking carrying out flag MSK is set to "1", and the shown process ends to advance the process to a step 900 of FIG. 3.

Figure 9:
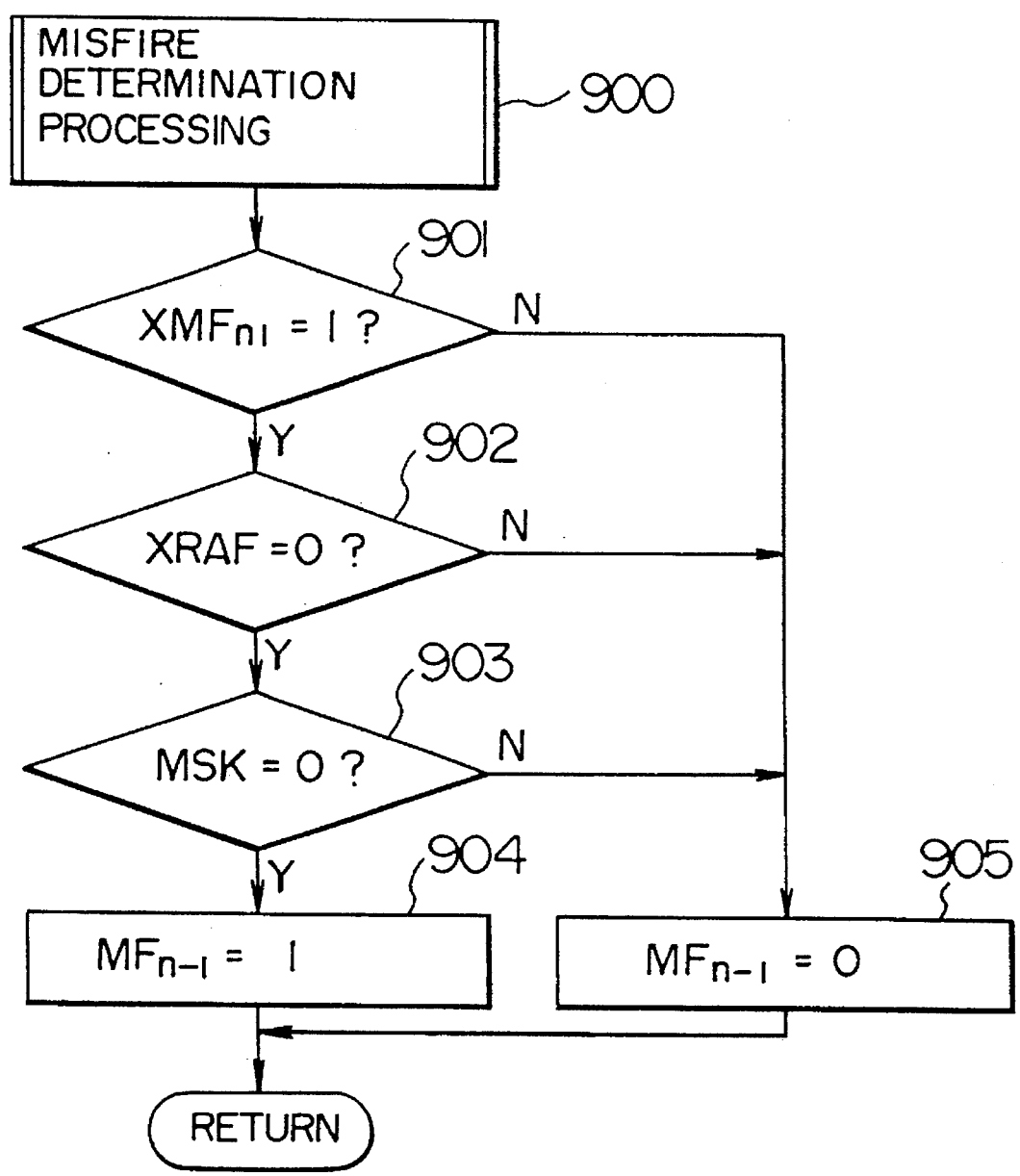
FIG. 9 is a flowchart of a misfiring determination process to be executed by the ECU of the first embodiment.

At the step 900, the misfiring determination process is executed. FIG. 9 shows a flowchart of the misfiring determination process. The following discussion will be given with reference to the flowchart.

At first, at a step 901, a check is made as to whether a provisional misfiring determination flag $MF_{n-1}$ is "1" or not. If $MF_{n-1}$ is "1" (if misfiring is provisionally determined), the process is advanced to a step 902. On the other hand, if $MF_{n-1}$ is "0", the process is advanced to a step 905. At the step 902, a check is performed as to whether the rough road determination flag XRAF is "0" or not. If XRAF is "0" (if not traveling on a rough road), the process is advanced to a step 903. On the other hand, when the XRAF is "1", the process is advanced to the step 905. At the step 903, check is made as to whether the masking carrying out flag MSK is "0" or not. If MSK is "0", the process is advanced to a step 904, and if MSK is "1", the process is advanced to the step 905. When the foregoing condition is satisfied, the misfiring determination flag $MF_{n-1}$ is set to "1" at the step 904. Then, by judging that misfiring is currently occurring, the shown routine ends. Then, the process is advanced to a step 1000 of FIG. 3. On the other hand, at the step 905, the misfiring determination flag $MF_{n-1}$ is set to "0" and then the shown routine ends. Then, the process is advanced to the step 1000 of FIG. 3.

At the step 1000 of FIG. 3, $\omega_i$ and $\Delta\omega_i$ are updated so that misfiring determination for the current spark ignition can be made in the next execution cycle. Therefore, respective $\omega_i$ (i=n, n−1, n−2, n−3) are set to $\omega_{i-1}$ (i=n, n−1, n−2, n−3) and respective $\Delta\omega_i$ (i=n, n−1, n−2, n−3) are set to $\Delta\omega_{n-1}$ (i=n, n−1, n−2, n−3). Then, the shown routine of FIG. 3 ends.

Next, the process for preventing erroneous detection of misfiring due to vehicle juddering as executed in the routine of FIG. 8 will be discussed with reference to a timing chart in FIG. 10.

Figure 10:
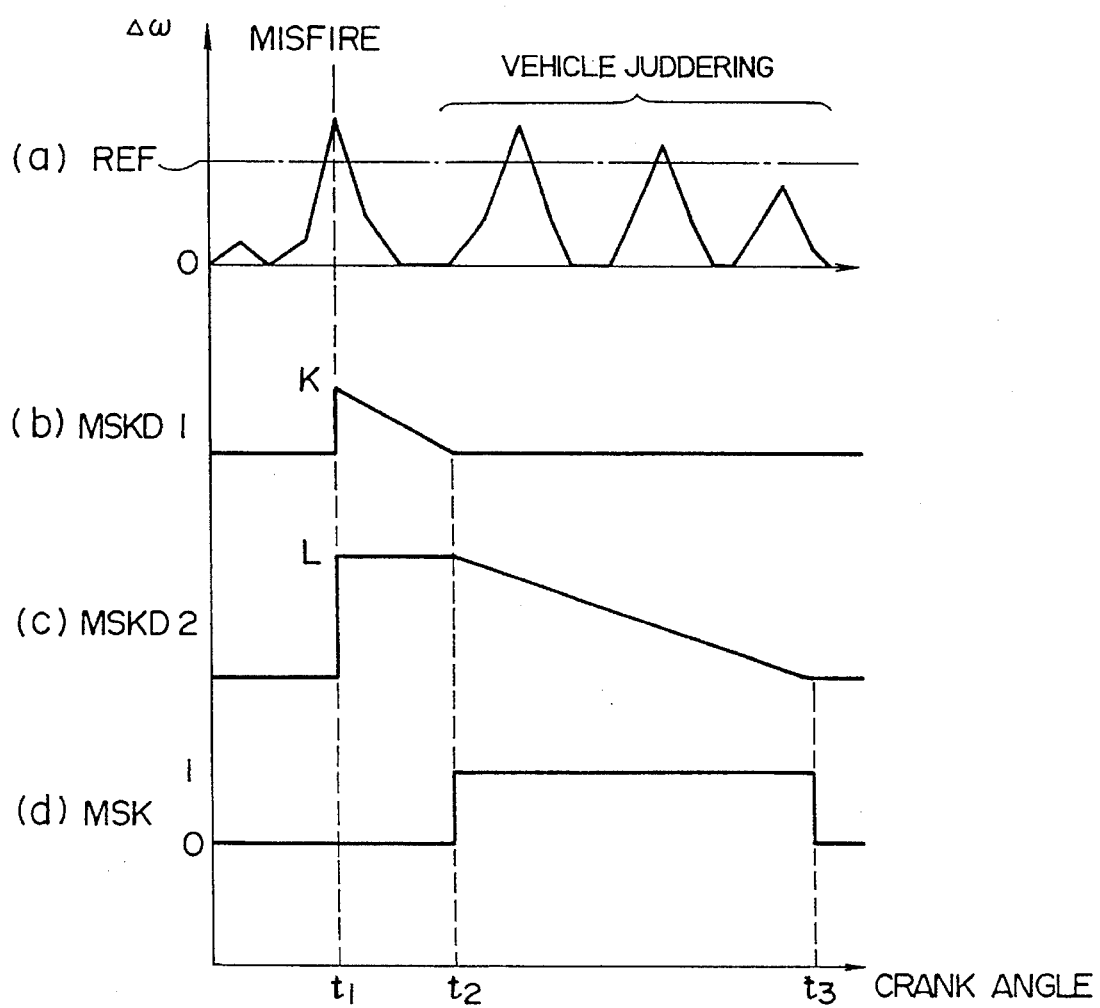
FIGS. 10A–10D are timing charts for explaining the process of avoiding erroneous misfiring determination caused by vehicle juddering, executed by the ECU of the first embodiment.

Waveform (a) of FIG. 10 is a timing chart showing values of $\Delta\omega$ at various crankshaft angular positions. When misfiring is caused at a crankshaft angular position $t_1$, thereafter vehicle juddering takes place. In such a case, "K" is set in the masking delay counter MSKD1 (waveform (b) in FIG. 10) and "L" is set in the masking carrying out counter MSKD2 (waveform (c) in FIG. 10), respectively. Then, the masking delay counter MSKD1 initiates counting down. On the other hand, the masking carrying out counter MSKD2 is held inactive so as not to perform counting down until the counted value of the masking delay counter MSKD1 becomes "0" at a crankshaft angular position $t_2$. At the crankshaft angular position $t_2$, the masking delay counter MSKD1 becomes "0", then the masking carrying out counter MSKD2 initiates counting down. Furthermore, at the crankshaft angular position $t_2$, the masking carrying out flag MSK is set to "1" to mask misfiring determination (waveform (d) in FIG. 10). This masking of misfiring determination is maintained until the counted value of the masking carrying out counter MSKD2 becomes "0" at a time $t_3$ and the masking carrying out flag MSK is reset to "0".

Through the foregoing processes, while vehicle juddering is occurring as illustrated in waveform (a) of FIG. 10, misfiring determination is not performed. Therefore, erroneous detection of misfiring due to vehicle juddering can be prevented. The reason for avoiding to inhibit misfiring determination during a period, in which the masking delay counter MSKD1 performs counting, is that misfiring could occur consecutively before the occurrence of vehicle juddering. When consecutive misfiring takes place, vehicle juddering can occur only after the final misfiring. Therefore, in such a case, masking is carried out to prevent erroneous misfire detection from being caused by vehicle juddering after the detection of the final misfiring has been made.

Figures 11, 12:
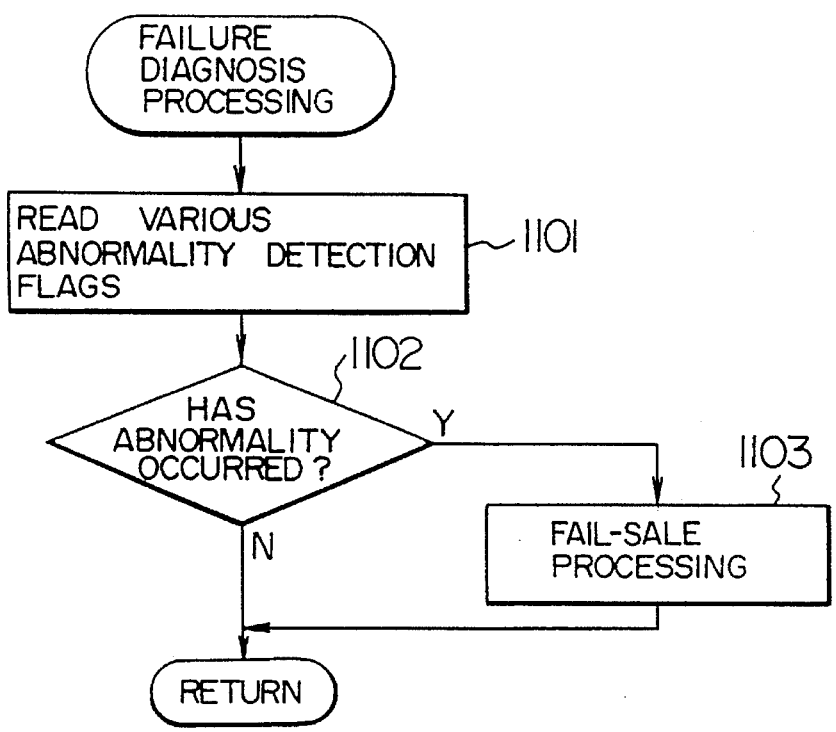
FIG. 11 is a flowchart of a failure diagnosis process executed by the ECU of the first embodiment.
FIG. 12 is an explanatory illustration of a REF map employed in the first embodiment.

Next, the failure diagnosis process illustrated in FIG. 11 will be discussed with reference to the flowchart. The shown flowchart is executed as an interrupt process by the CPU 21 at every given interval. At first, at a step 1101, a various abnormality detection flag storing information from various sensors which detect whether the actuators are operating in normal states, a misfiring determination flag $MF_{n-1}$ which is set to "1" when misfiring is determined through the foregoing misfiring determination process, and so forth, are read out.

Then, at a subsequent step 1102, states of the various abnormality detection flags read at the step 1101 are checked. For example, when the misfiring determination flag $MF_{n-1}$ is set to "1", the process is advanced to a step 1103, and otherwise, when the misfiring determination flag $MF_{n-1}$ is set to "0", the process ends and return to the main routine.

At the step 1103, for protecting a catalyst or for preventing HC concentration in an exhaust gas from increasing, a fuel supply for the cylinder, on which misfiring is detected, is cut off, the alarm lamp 29 (shown in FIG. 2) is turned ON to notify a driver of the occurrence of misfiring or other fail-safe processes are performed corresponding to the abnormality detection.

Next, a discussion will be given of the effects achieved by the steps 500, 600 and 700 in the shown embodiment.

In general, while the vehicle travels on a smooth road and when the internal combustion engine is driven in a normal spark ignition condition, the variation magnitude $\Delta\omega$ of the engine speed variations is maintained at a value near zero. When misfiring is caused in the internal combustion engine, $\Delta\omega$ derived with respect to the cylinder, in which misfiring is caused, becomes large. Accordingly, the varying state of $\Delta\omega$ upon occurrence of misfiring at a specific cylinder is abnormally large at the instant of the occurrence of misfiring, but it is small for normal spark ignition before and after the occurrence of misfiring, as shown in FIG. 15A.

By contrast, when the vehicle travels on a rough road, the engine speed fluctuates depending upon roughness of the road surface. At this time, the varying state of the variation magnitude $\Delta\omega$ of the engine speed variations becomes as illustrated in FIG. 15B by the influence of the natural frequency of the vehicle, a rotation speed ratio of the wheel and the crankshaft, the torque transmission path from the wheel to the crankshaft, and so forth. As can be clear from FIG. 15B, the value of $\Delta\omega$ does not show a sharp peak as in the FIG. 15A but shows a moderate curve. Namely, the varying state of $\Delta\omega$ is different upon the occurrence of misfiring and upon travelling on a rough road. In detail, the ratios between the peak value of $\Delta\omega$ and the values of $\Delta\omega$ before and after the peak value becomes large at the time of occurrence of misfiring and small on a rough road.

The shown embodiment prevents erroneous detection of misfiring due to variations of the engine speed caused during traveling on a rough road by utilizing the characteristics of the varying state of $\Delta\omega$ while the vehicle travels on a rough road.

Figure 15A:
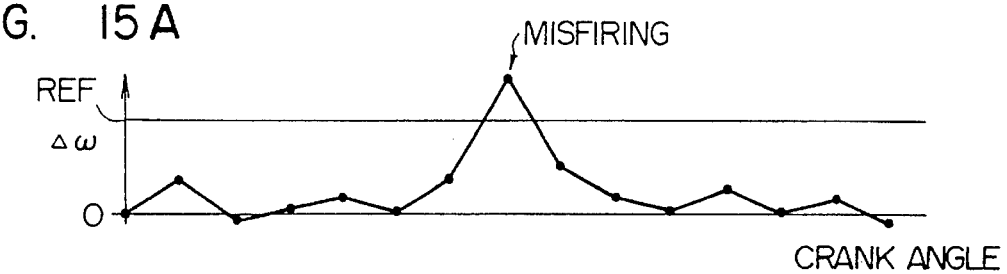
FIGS. 15A–15D are characteristic charts showing the varying state of $\Delta\omega$.
Figure 15B:
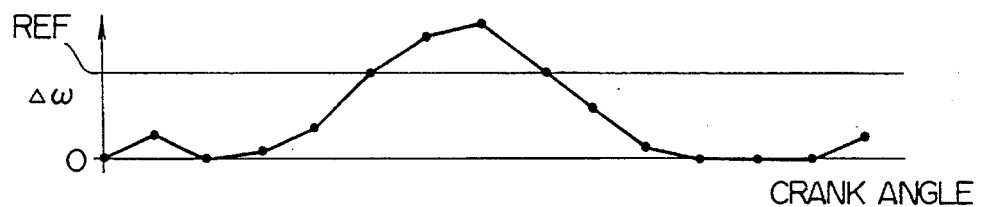

Here, when one time misfiring is caused in the internal combustion engine to cause the varying state of $\Delta\omega$ as illustrated in FIG. 15A or when the vehicle travels on a rough road to cause the varying state of $\Delta\omega$ as illustrated in FIG. 15B, the value of RAM value MFCYL becomes different from that in the preceding execution cycle in the comparison determination value computation process. Then, since the counter CMFCNT becomes "0" at the step 506, the comparison determination values K1 and K2 are set to A and B. Thus, at the step 601 of FIG. 6, the ratio $\Delta\omega_{n-1}/\Delta\omega_{n-2}$ of the variation magnitude of the engine speed variations at the immediately preceding cycle and at the two preceding cycle is compared with the comparison determination value K1, and at the step 602, $\Delta\omega_{n-1}/\Delta\omega_n$ is compared with the comparison determination value K2. At this time, according to the characteristics set forth above, when two ratios are greater than the comparison determination values, a judgment can be made that one time misfiring is caused. On the other hand, when at least one of the ratios is smaller than the corresponding one of the comparison determination values, then, a judgment can be made that the vehicle is travelling on a rough road.

By this, an erroneous detection of misfiring due to variations of the engine speed while the vehicle travels on a rough road can be prevented.

Figure 15C:
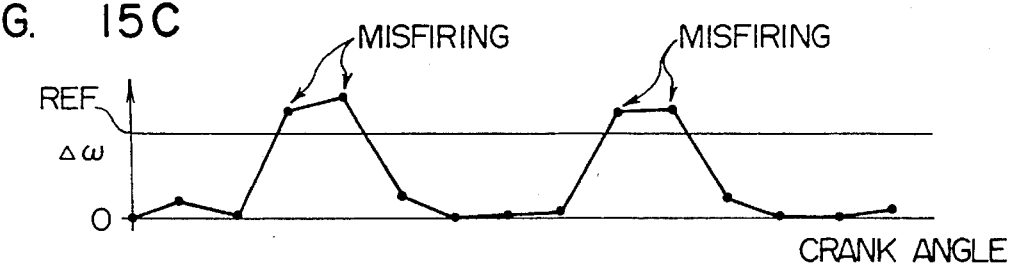

However, when a process is performed by setting the comparison determination valves K1 and K2 to A and B, respectively, misfiring cannot be detected when misfiring is continuously caused in the sequentially ignited cylinders. Namely, when misfiring is caused in two sequentially ignited cylinders, the varying state of $\Delta\omega$ becomes as illustrated in FIG. 15C so that one of the ratios of $\Delta\omega$ at the occurrence of misfiring and $\Delta\omega$'s before and after occurrence of misfiring becomes small or large, respectively. Therefore, the ratio of $\Delta\omega$ at the occurrence of misfiring to $\Delta\omega$'s before and after the occurrence of misfiring becomes smaller than one of the comparison determination values K1 and K2 set to A and B, so that misfiring cannot be determined.

Here, when misfiring is caused in the sequentially ignited cylinders as set forth above, the value of the RAM value MFCYL in the comparison determination value computation process of FIG. 5 is held unchanged.

Accordingly, the counter MFCNT is increased at the step 505. When the counter CMFCNT becomes greater than the predetermined value k at the step 507, the comparison determination values K1 and K2 are set to a and b at the step 508, respectively. Since a and b are set to smaller values than A and B, an affirmative determination is made at the steps 601 and 602 even when the ratio of $\Delta\omega$ becomes small due to sequential misfiring at sequentially ignited cylinders.

Therefore, the process can be advanced to the step 603 to make it possible to determine misfiring. Accordingly, it becomes possible to prevent erroneous detection as normal ignition despite the fact that misfiring is caused in sequentially ignited cylinders.

Figure 16:
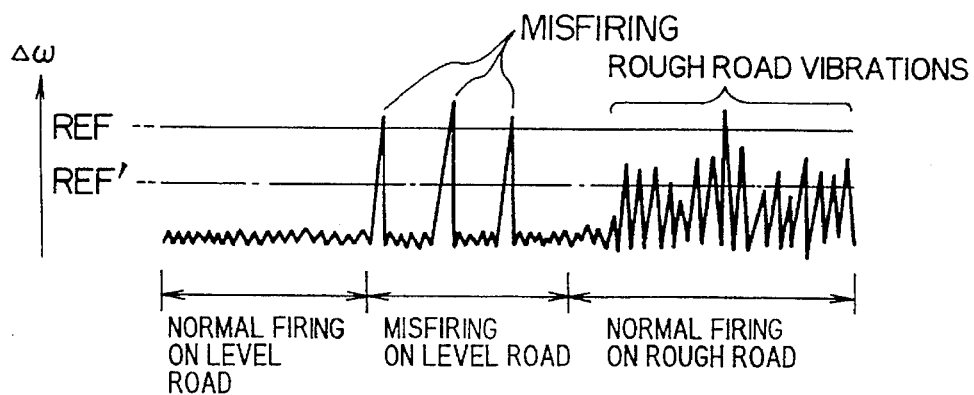
FIG. 16 is a characteristic chart showing the varying state of $\Delta\omega$ depending upon vehicle travelling conditions.

In addition, since there still remains a case where erroneous detection of misfiring during travelling on a rough road cannot be avoided solely by the variation pattern of the variation magnitude Δω, the rough road determination reference REF' which is smaller than the misfiring determination reference REF independently of the latter is provided to finally make determination of the rough road on the basis of the time of occurrence of variation magnitude between the misfiring determination reference REF and the rough road determination reference REF', thereby preventing misfire determination. FIG. 16 shows the engine speed variation magnitude Δω at normal ignition on a smooth road, at misfiring on a smooth road and normal ignition on a rough road. Although it is possible to completely distinguish normal ignition and misfiring on a smooth road, since the value of Δω fluctuates significantly on a rough road due to roughness of the road surface, the value of Δω frequently falls between the misfiring determination reference REF and the rough road determination reference REF'. Therefore, the present invention completely prevents erroneous detection of misfiring on a rough road by taking the foregoing characteristics into account. Namely, by determining travelling on a rough road at the step 705 of FIG. 7, erroneous detection of misfiring is prevented.

Figure 1B:
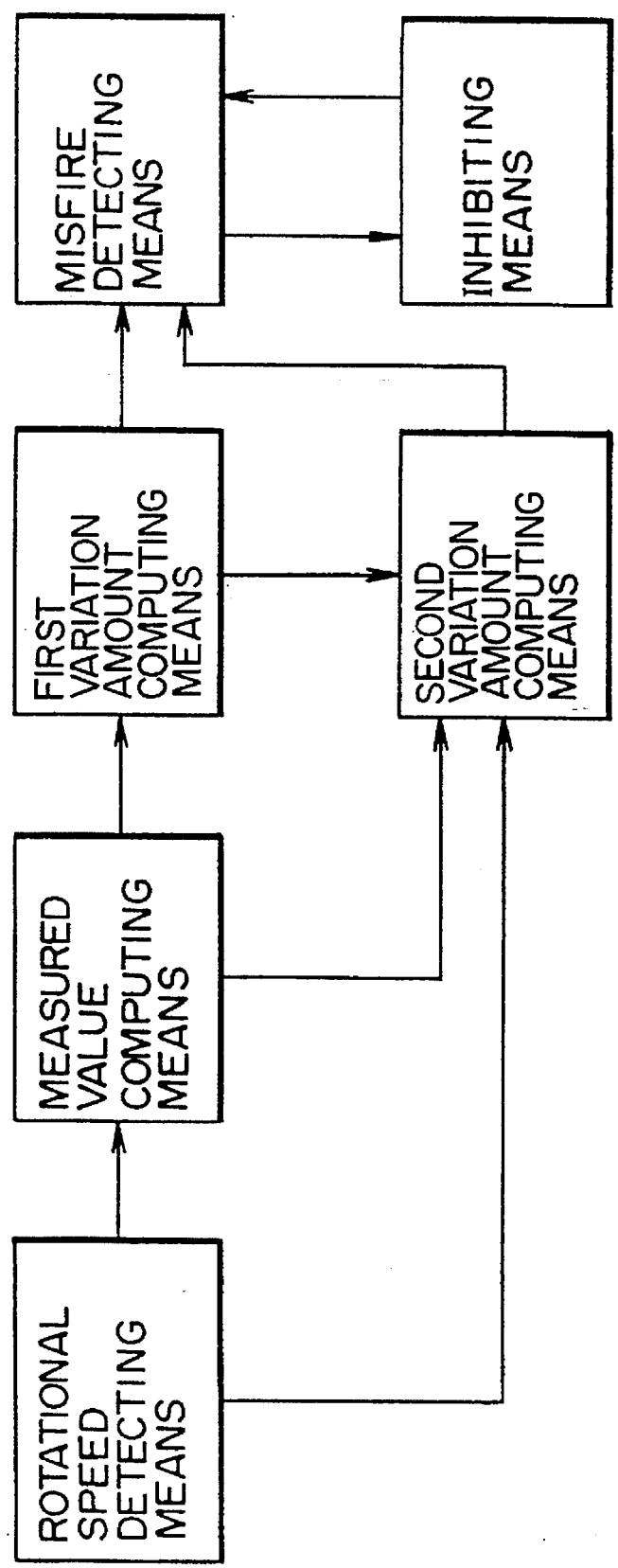
FIG. 1B is a functional block diagram showing elements in the second aspect of the present invention.

When making a comparison between respective steps in the first embodiment and the functional blocks in FIG. 1, the crank angle sensor 10 performs a function corresponding to an engine speed signal generating means, the steps 100 and 300 of FIG. 3, the steps 401 and 402 of FIG. 4 perform a function corresponding to measured value computing means, first two terms in the equation to be calculated in the step 403 performs a function corresponding to a first variation magnitude computing means, the step 900 of FIG. 9 performs a function corresponding to the misfiring detecting means, and the steps 805 and 807 perform a function corresponding to an inhibiting means.

The foregoing first embodiment prevents erroneous detection of misfiring from being caused by vehicle juddering. Such vehicle juddering is caused when a clutch is engaged in the case of a vehicle having a manual power transmission and when a lock-up clutch is engaged (lock-up condition) in the case of a vehicle having an automatic power transmission. Namely, vehicle juddering is caused when the engine is directly coupled with the wheels. Therefore, in the case where the transmission is at a neutral position or while the engine is coupled with the wheel through a torque converter, the influence of vehicle juddering is not large.

Therefore, under the condition where the influence of vehicle juddering is small, it may be possible to stop the masking process for inhibiting misfiring detection. Also, since the magnitude of vehicle juddering differs depending upon an engine load, an engine speed, and so forth, the masking delay period and/or the masking carrying out period may be determined depending upon an engine load, an engine speed, a transmission gear position and so forth. Namely, since vehicle juddering becomes greater at a greater moment of inertia of the vehicle, the magnitude of vehicle juddering becomes greater at a lower gear position, a lower vehicle speed, a higher engine load and a lower engine speed. Therefore, in such condition, it is preferable to make the masking execution period longer.

The second embodiment is worked out for realizing such a process. The construction of the second embodiment is illustrated in FIG. 18. In the shown embodiment, the set value "L" of the masking carrying out counter is derived on the basis of the transmission gear position, the vehicle speed, a throttle open degree and the engine speed in the vehicle with the manual power transmission. Also, in the shown embodiment, when the transmission is at a neutral position, it is regarded that no influence of vehicle juddering is present in the detection of misfiring. Hereinafter, a difference between the shown embodiment from the construction shown in FIG. 2 will be discussed with reference to FIG. 18.

In FIG. 18, in addition to the construction of FIG. 2, a gear position sensor 30 for detecting a current transmission gear position, a vehicle speed sensor 31 for measuring an instantaneous vehicle speed, and a throttle angle sensor 32 for measuring a throttle open degree are provided for providing signals to the input/output port 25 of the ECU 20.

Next, the process to be executed by the ECU 20 in the second embodiment will be discussed with reference to a flowchart shown in FIG. 19. In the following discussion, the steps performing the similar process to those of FIG. 8 will be represented by the same step number and discussion therefor will be neglected.

When the shown routine is executed, a check is made at a step 810 whether vehicle juddering occurring condition is satisfied or not. Here, the vehicle juddering occurring condition is the state where the clutch is engaged. When the condition is satisfied, the process is advanced to a step 801. If the condition is not satisfied, the process is advanced to a step 811 to set the masking carrying out flag to "0". Then, the shown routine goes to END.

At the step 801, the masking carrying out flag MSK is checked as to whether it is set to "0" or not. If MSK is "0", the process is advanced to a step 802. Then, when the variation magnitude $\Delta\omega_{n-1}$ of the engine speed variation is checked as to whether it is greater than the misfiring determination reference REF at the step 802. When $\Delta\omega_{n-1}$ is greater than REF, the process is advanced to a step 812 to perform a process for setting the value of "L" of the masking carrying out counter MSKD2 on the basis of the current operating condition (engine load, engine speed, vehicle speed, the current transmission shift position). This process is illustrated in a flowchart in FIG. 20. A discussion will be given hereinafter with reference to this flowchart.

Figure 20:
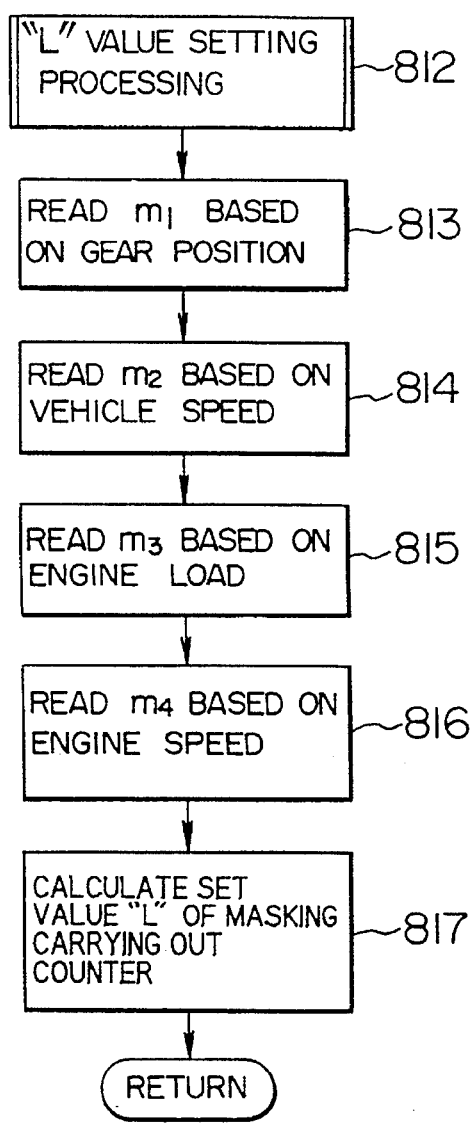
FIG. 20 is a flowchart of an "L" value setting process executed by the ECU in the second embodiment.
Figure 21A:
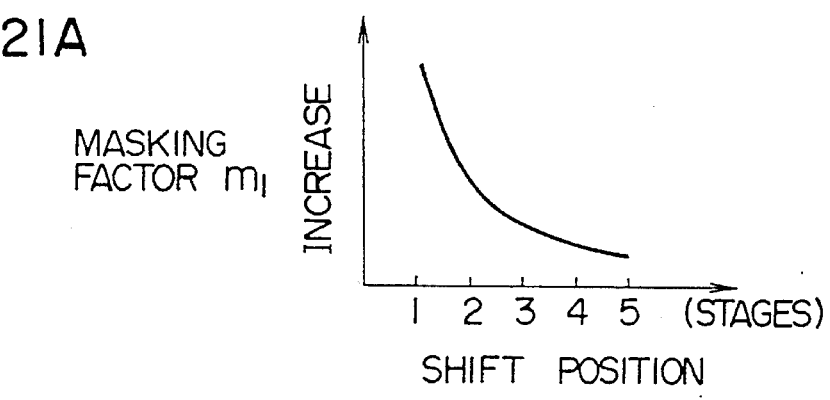
FIG. 21A is an explanatory illustration showing a map of the relation between a gear shift position and a masking execution period.
Figure 21B:
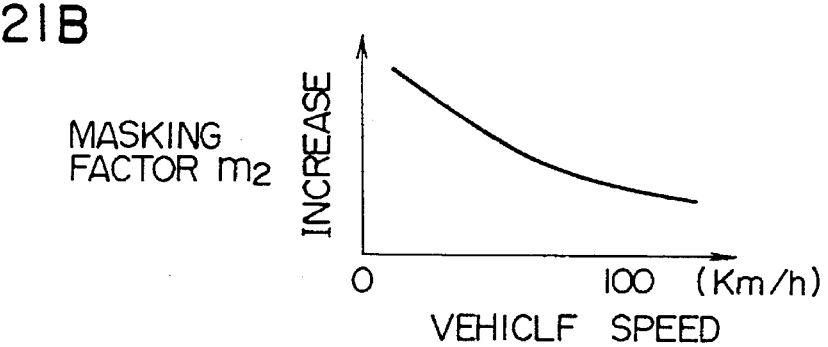
FIG. 21B is an explanatory illustration showing a map of the relation between a vehicle speed and a masking execution period.
Figure 21C:
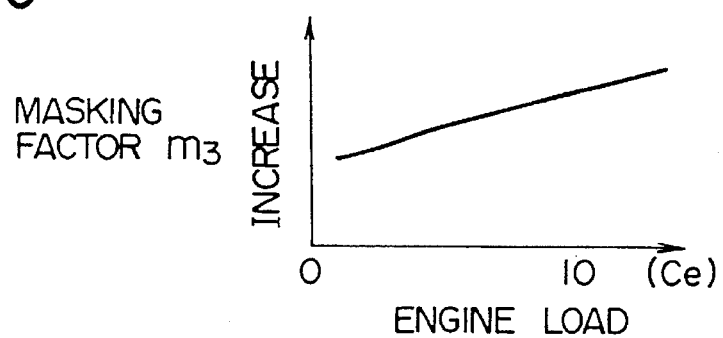
FIG. 21C is an explanatory illustration showing a map of the relation between a engine load and a masking execution period.
Figure 21D:
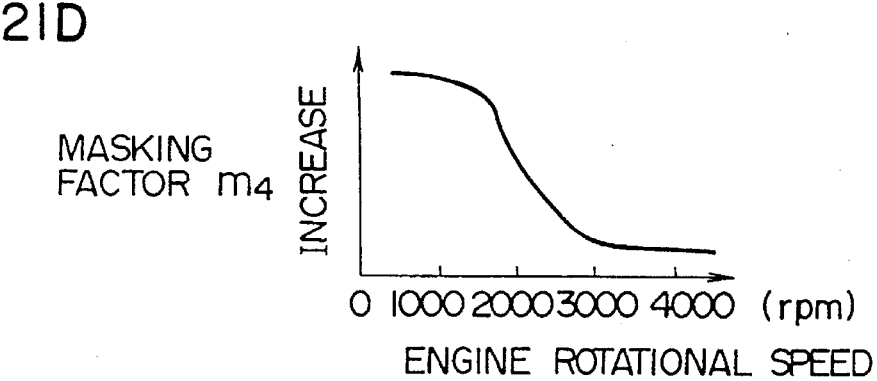
FIG. 21D is an explanatory illustration showing a map of the relation between an engine rotational speed and a masking execution period.

Once the "L" value setting process is performed at the step 812 of FIG. 20, a masking coefficient $m_1$ corresponding to the transmission shift position is read out from a map illustrated in FIG. 21A on the basis of the output of the gear position sensor 30 at a step 813. Then, a masking coefficient $m_2$ corresponding to the vehicle speed is read out from a map illustrated in FIG. 21B on the basis of the output of the vehicle speed sensor 31 at a step 814. A masking coefficient $m_3$ corresponding to the engine load (throttle opening degree) is read out from a map illustrated in FIG. 21C on the basis of the output of the throttle angle sensor 32 at a step 815. Similarly, at a step 815, a masking coefficient $m_4$ corresponding to the engine speed is read out from a map illustrated in FIG. 21D. Then, at a step 817, the set value "L" of the masking carrying out counter $MSKD_2$ is calculated by the following equation at a step 817.

$$L = L_{BASE} \cdot m_1 \cdot m_2 \cdot m_3 \cdot m_4 \qquad (5)$$

Here, $L_{BASE}$ is a preliminarily set predetermined value. When the foregoing process is completed, the process is advanced to a step 803 of FIG. 19. Since the subsequent process is the same as that discussed with respect to the first embodiment, the discussion therefor will be neglected.

Here, an additional discussion will be given of the maps in FIGS. 21A–21D. The maps are made to have a greater coefficient value at a lower transmission shift position, lower vehicle speed, larger engine load (throttle open degree) and lower engine speed. Namely, each coefficient value is set to a greater value at a greater inertia force of the vehicle.

Next, a discussion will be given for the third embodiment, in which the set value of the masking carrying out counter "L" on the basis of a transmission speed ratio, the vehicle speed, the throttle open degree and the engine speed for a vehicle with an automatic power transmission. The construction of the third embodiment is illustrated in FIG. 26. In the shown construction, the transmission gear position sensor 30 in the second embodiment shown in FIG. 18 is replaced with a lock-up state sensor 33. The lock-up state sensor 33 is adapted to produce a signal indicative of the state of the lock-up clutch. In the shown embodiment, a judgment is made so that any noticeable vehicle juddering will not occur while the lock-up clutch is held at a released state.

The third embodiment performs the same process except for the judgment condition at the step 810 of FIG. 19 and manner of detection of the transmission speed ratio at the step 813 of FIG. 20. Therefore, the following discussion will be given with reference to FIG. 19 primarily for the processes which are different from the second embodiment. At first, at the step 810, instead of making a judgment as to whether the transmission gear position is other than the neutral position or not as a vehicle juddering condition, occurs in the second embodiment, the shown embodiment checks if the lock-up clutch is engaged to establish the lock-up state or not. If the lock-up state is judged, the process is advanced to the step 801 and otherwise, the process is advanced to the step 811. Then, at respective steps, the processes set forth above are performed.

Next, discussion will be given for a transmission speed ratio detecting process. Although the second embodiment detects the transmission gear position by means of the transmission gear position sensor 30, the third embodiment is adapted to detect the transmission speed ratio on the basis of the engine speed and the vehicle speed. This process is illustrated in a flowchart of FIG. 22. The process will be discussed with reference to the flowchart. It should be appreciated that the shown process is added and executed before the step 813 of FIG. 20.

Figure 22:
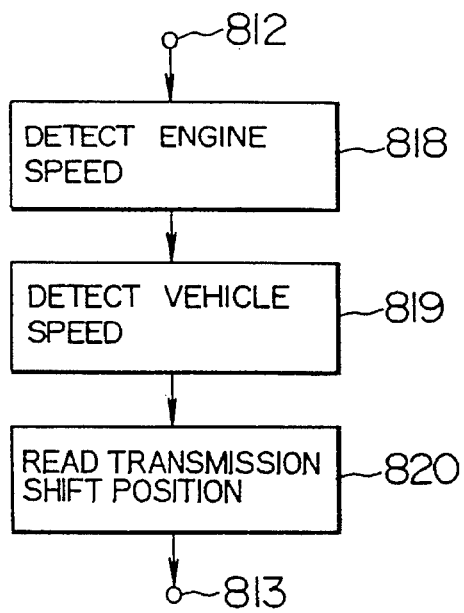
FIG. 22 is a flowchart showing a shift position detecting process executed by the ECU in the third embodiment.
Figure 23A:
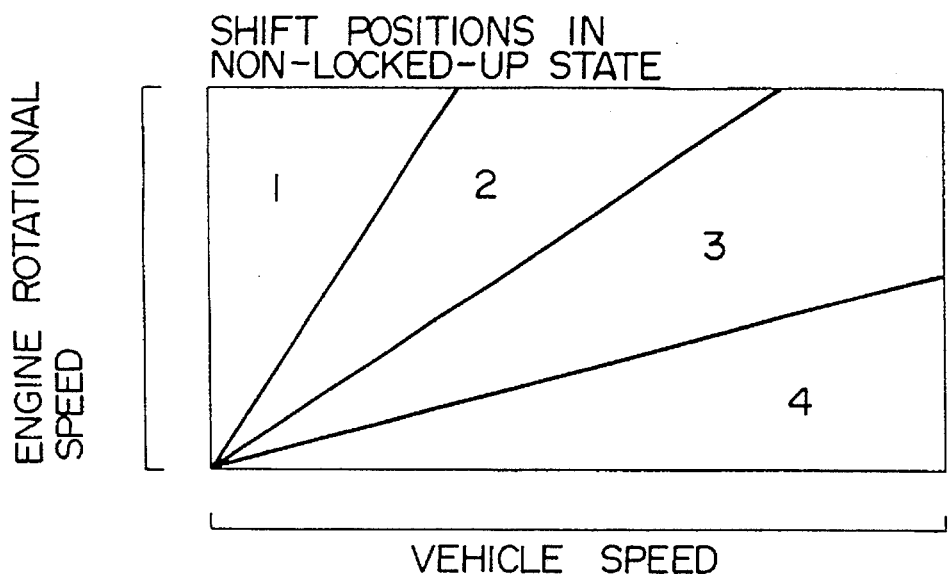
FIG. 23A is an explanatory illustration of a map for obtaining a shift position in a non-locked-up state on the basis of an engine speed and a vehicle speed in the fourth embodiment.
Figure 23B:
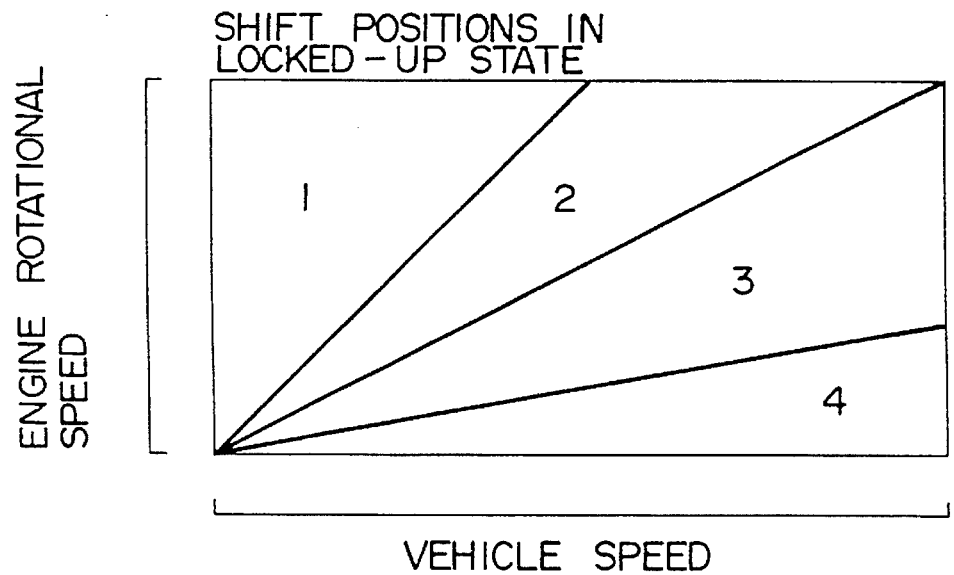
FIG. 23B is an explanatory illustration of a map for obtaining a shift position in a locked-up state on the basis of an engine speed and a vehicle speed in the third and fourth embodiment.

At first, at a step 818 in the flowchart of FIG. 22, the engine speed is detected. Then, at a step 819, the vehicle spewed is detected. At a step 820, a transmission shift position is read out from a map illustrated in FIG. 23B in terms of the engine speed detected at the step 818 and the vehicle speed detected at the step 819. Thereafter, the process is advanced to the step 813 to perform the process set forth above.

Next, the fourth embodiment, in which the influence of vehicle juddering during a fluid coupling state under the lock-up released condition in the vehicle with the automatic power transmission will be discussed with reference to FIG. 19. Discussion will be given primarily the differences with respect to the second embodiment.

In this embodiment, instead of detecting the transmission shift position by means of the transmission gear position sensor 30, the transmission shift position of the automatic power transmission is detected on the basis of the lock-up state, engine speed and the vehicle speed. This transmission shift position detection process will be discussed with reference to the flowchart shown in FIG. 25.

Figure 24:
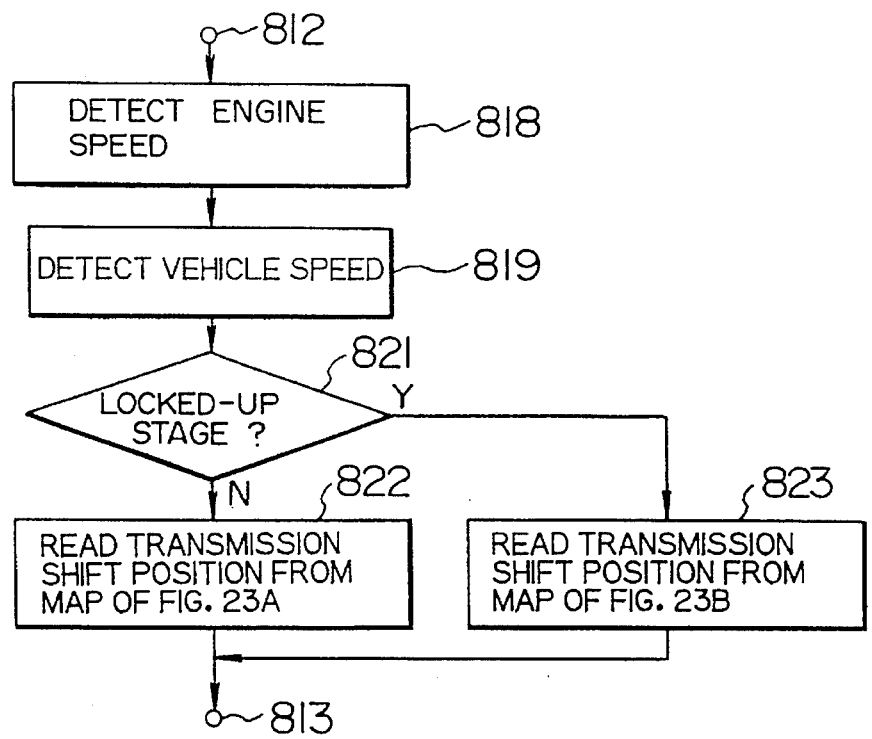
FIG. 24 is a flowchart of a shift position detecting process executed by the ECU in the fourth embodiment.

At the step 812 of FIG. 20, once the "L" value setting process is executed, at a step 818 of the flowchart of FIG. 24, the engine speed is detected. Also, at a step 819, the vehicle speed is detected. Subsequently, at a step 821, a judgment is made as to whether the lock-up clutch is in lock-up state or not. If not the lock-up state, the process is advanced to a step 822 to read out the transmission shift position corresponding to the engine speed and the vehicle speed from a map illustrated in FIG. 23A. Then, process is advanced to the step 813. On the other hand, if the lock-up state is judged at the step 821, the process is advanced to a step 823 to read out the transmission shift position corresponding to the engine speed and the vehicle speed from the map illustrated in FIG. 23B. In the lock-up released state, slip is caused in the torque converter, and the vehicle speed becomes lower at the same transmission shift position and the same engine speed. After reading out the transmission shift position, the process is advanced to the step 813. Through the processes set forth above, the instantaneous transmission shift position is detected.

Figure 25:
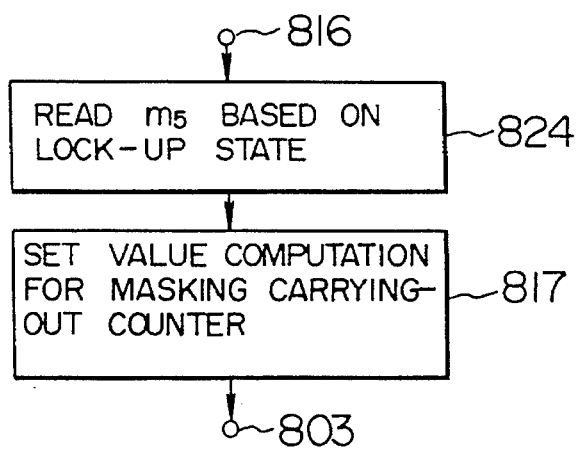
FIG. 25 is a partial flowchart of an "L" value setting process executed by the ECU in the fourth embodiment.

Once the transmission shift position detecting process is completed, the foregoing processes are performed through the steps 813–816. After the process at the step 816, a process shown in FIG. 25 is added and executed. Namely, at a step 824 of FIG. 25, a masking coefficient $m_5$ determined depending upon lock-up state or release state of the lock-up clutch. This value is illustratively $m_5=1$ at the lock-up state and $m_5=0.5$ at the lock-up released state in this embodiment. Then although the second embodiment derives the setting value of the masking carrying out counter MSKD2 through the equation (5), this fourth embodiment calculates the set value of the masking carrying out counter MSKD2 through the following equation (6), to which a correction with the masking coefficient $m_5$ is added.

$$L = L_{BASE} \cdot m_1 \cdot m_2 \cdot m_3 \cdot m_4 \cdot m_5 \quad (6)$$

The subsequent processes are the same as shown in the flowchart of FIG. 19, discussed previously with respect to the second embodiment, and therefore are neglected from this portion of the discussion.

It should be appreciated that although the foregoing embodiment for the vehicle with the automatic power transmission detects the transmission speed ratio on the basis of the engine speed and the vehicle speed, it may be possible to provide a sensor for directly detecting the transmission operational range similarly to the second embodiment.

Next, the fifth embodiment, in which the setting values a and b are set on the basis of the values stored in RAM value MFCYL, will be discussed with reference to a flowchart shown in FIG. 27.

The shown flowchart is established by adding steps 5071, 5072 and 5073 for the flowchart of the comparison determination value computation process in FIG. 5. Therefore, the same step numbers are given for the steps performing the same as those shown in FIG. 5 and are therefore neglected from this portion of the discussion.

When the process is progressed to the step before the step 507, the counter CMFCNT is checked to determine if it is greater than the predetermined value k. When the counter CMFCNT is smaller than the predetermined value k, the process is advanced to the step 509 to perform the same processes as those for to the first embodiment through the subsequent steps. When the counter CMFCNT is greater than the predetermined value, the process is advanced to the step 5071.

At the step 5071, check is performed if bits of the RAM value CMFCNT for the immediately preceding cylinder and immediately following cylinder with respect to the cylinder currently checked misfiring are "1". If so, the process is advanced to the step 5073 and otherwise, the process is advanced to the step 5072. At the step 5072, the values of a and b which are set as the comparison determination values K1 and K2 in the subsequent step 508, are set to 0. On the other hand, at the step 5073, the values of a and b which are set as the comparison determination values K1 and K2 in the subsequent step 508, are set to 1.

Figure 15D:
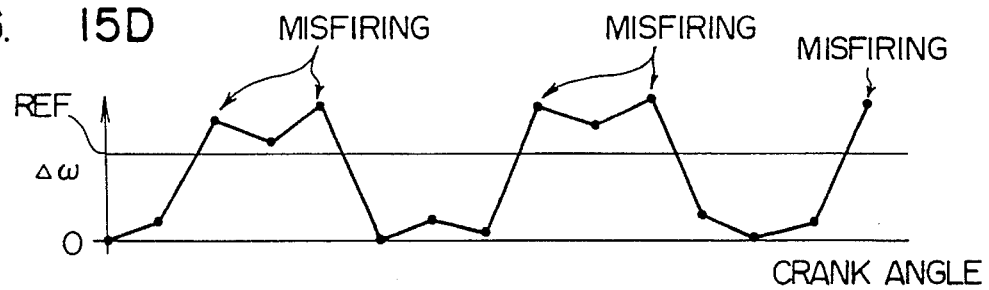

By performing the foregoing process, among a condition where a plurality of cylinders cause sequential misfiring, when the misfiring is caused sequentially in the cylinders ignited immediately before and after the cylinder currently checked if misfiring is caused as shown in FIG. 15D, the set values a and b are set at "1"m for example. (It should be possible to maintain the set values A and B in this case.) For other cases, e.g. when misfiring is caused in sequentially ignited cylinders as shown in FIG. 15C, the set values a and b are set to "0".

By this, in addition to the effect set out with respect to the first embodiment, misfiring occurring in the cylinder between the misfiring cylinders can be certainly detected. Namely, even when the cylinder in between the misfiring cylinders is in normal condition, the value of $\Delta\omega$ becomes large as shown in FIG. 15D. In such case, if the comparison determination value is maintained at "0", misfiring can be judged despite of the fact that the cylinder is in a normal combustion state. Therefore, in such case, by setting the comparison determination values K1 and K2 to "1", an erroneous detection of misfiring can be avoided. Namely, in this case, although $\Delta\omega$ of the cylinder between the misfiring cylinders becomes greater than the REF to lead positive answer at the step 603 of FIG. 6, it becomes a smaller value than $\Delta\omega$ of the adjacent cylinder when the cylinder is in a normal combustion state (see FIG. 15D). Therefore, the ratio of $\Delta\omega$ of these cylinders becomes smaller than "1" so that the answers at the steps 601 and 602 which is executed before the step 603 of FIG. 6, become negative to advance the step 608 to make judgment that the cylinder is in normal combustion state.

Figure 27:
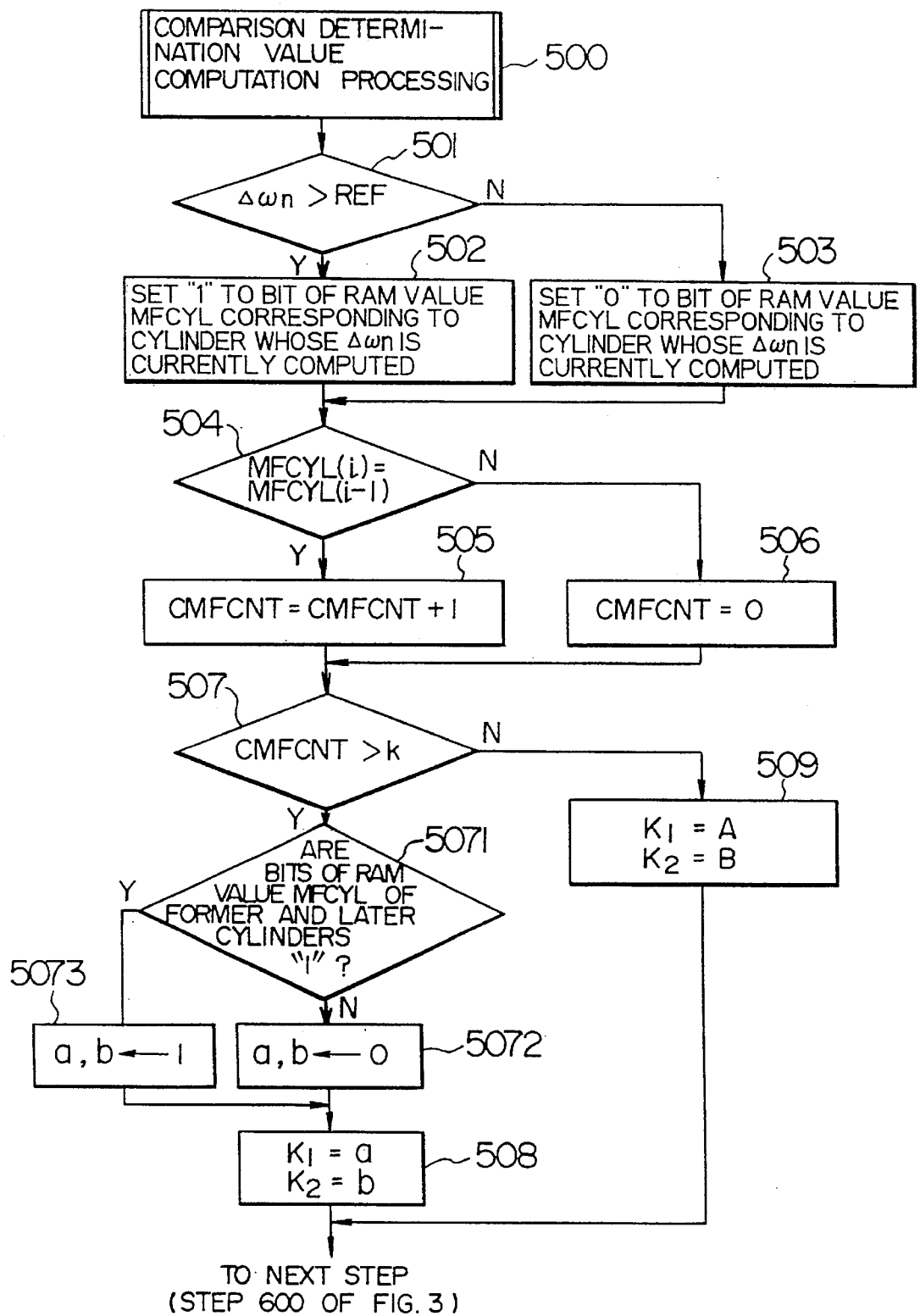
FIG. 27 is a flowchart showing a process of calculating a reference value for comparison in the fifth embodiment.
Figure 28:
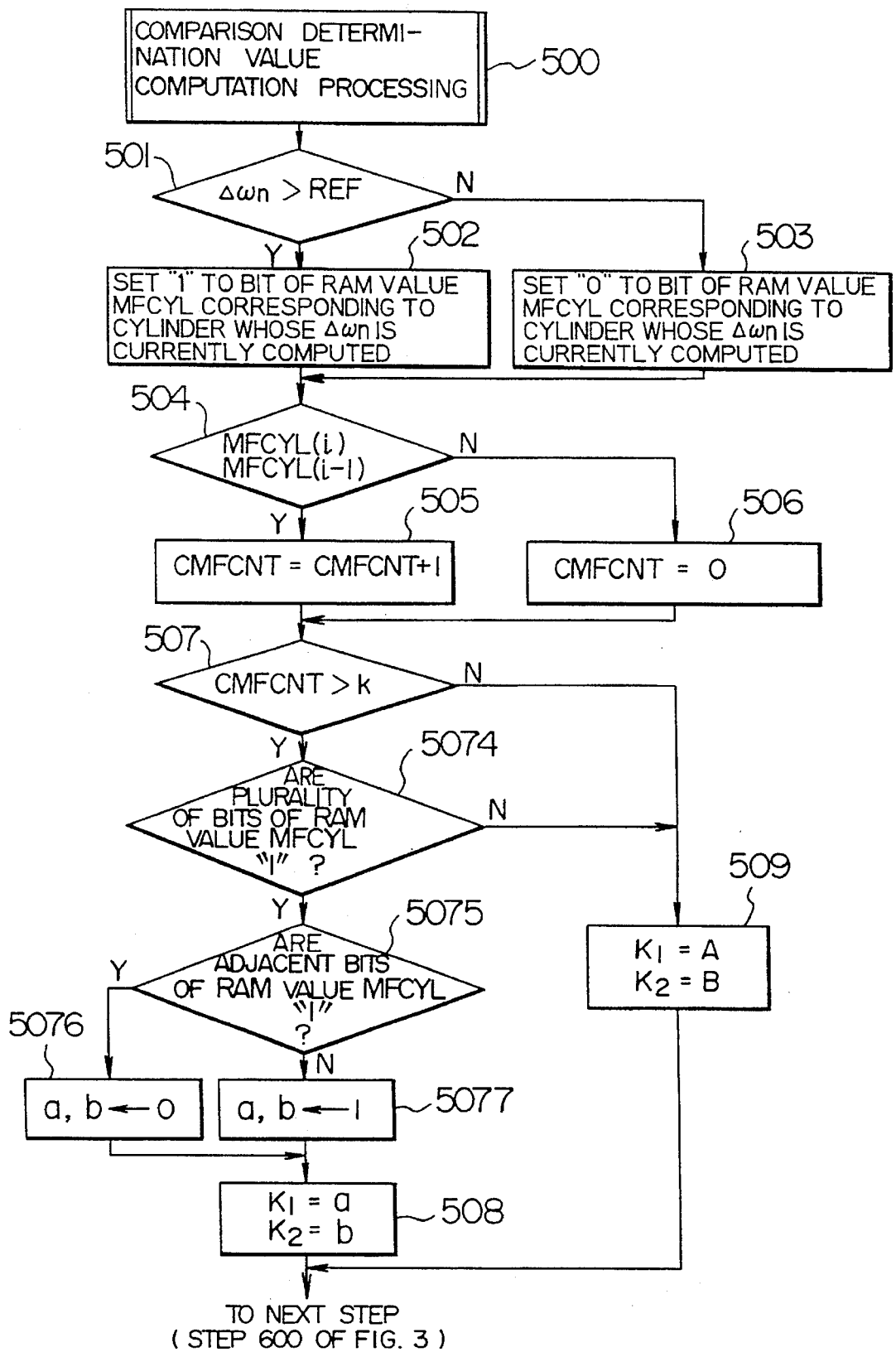
FIG. 28 is a flowchart showing a process of calculating a reference value for comparison in another embodiment.

Furthermore, although the fifth embodiment modifies the values a and b to be set to the comparison determination values K1 and K2 by making a judgment as to whether the bits of the RAM value MFCYL of the immediately preceding and immediately following cylinders to the cylinder which is currently checked as to whether misfiring is caused as shown in the step 507 of FIG. 27, it can be done through other processes as illustrated in a form of a flowchart in FIG. 28. The following discussion will be given only with respect to the difference between the embodiments.

In place of the step 507 of FIG. 27, a step 5074 is executed in FIG. 28, in which a check is made as to whether the bits of the RAM value MFCYL set to "1" are plural or not. If not plural, the process is advanced to the step 509 to set the comparison determination values K1 and K2 to A and B. On the other hand, if a plurality of bits of the RAM value MFCYL are set to "1", the process is advanced to a step 5075. At the step 5075, a check is performed as to whether the bits of the RAM value MFCYL set to "1" correspond to sequentially ignited cylinders or not. Then, if those bits correspond to adjacent cylinders, such as bit 0 (corresponding to #1 cylinder) and bit 1 (corresponding to #2 cylinder), the process is advanced to a step 5076, in which the values a and b to be set forth the comparison determination values K1 and K2 at the subsequent step 508, are set to "0". On the other hand, when the bits of the RAM value MFCYL set to "1" do not correspond to the adjacent cylinders, such as bit 0 (corresponding to #1 cylinder) and bit 1 (corresponding to #2 cylinder), the process is advanced to a step 5077, in which the values a and b are set to "1". By this, the similar effect to the fifth embodiment can be obtained.

As set forth above, with the construction and function of the misfiring detecting system for the internal combustion engine according to the present invention, when a judgment is made that variation of the engine speed is caused in the one of the cylinders sequentially, misfiring of the internal combustion engine is judged by the first misfiring determining means so that misfiring can be detected even when misfiring is caused at sequentially ignited cylinders.

On the other hand, when a judgment is made that the engine speed variation in the same cylinder is not caused sequentially, misfiring is detected by the second misfiring determining means. Therefore, in both comparing means in the second misfiring determination means, a judgment can be made that the vehicle is traveling on a rough road or that misfiring is not caused if the value derived from the two rotational speed variations is smaller than REF.

Accordingly, erroneous detection during travel on a rough road can be successfully avoided. Also, even when misfiring has occurred in sequentially ignited cylinders, it is possible to detect such misfiring accurately. Furthermore, when a condition of causing vehicle juddering is satisfied, the detection of misfiring can be inhibited. In addition, since the misfiring detection inhibiting period can be set depending upon the engine operating condition, it is possible to perform all the more accurately misfiring detection.

As will be understood herefrom, according to the misfiring detecting system of the internal combustion engine according to the present invention, when an engine speed variation is caused by the occurrence of misfiring, misfiring detection is inhibited after the detection of misfiring so as to avoid erroneous misfiring detection.

What is claimed is:

1. A misfiring detecting system for an internal combustion engine having a plurality of cylinders comprising:

engine rotational signal generating means for outputting an engine rotational signal at every predetermined angle of angular displacement during rotation of said internal combustion engine;

engine rotational speed variation amount computing means for computing an engine rotational speed variation amount per ignition on a basis of said engine rotational signal from said engine rotational signal generating means;

misfire determination value setting means for setting a misfire determination value on a basis of an operating condition of said internal combustion engine;

decision means for making a decision as to whether an engine speed variation is caused consecutively in one of said plurality of cylinders of said internal combustion engine;

first misfire determination means, operative when said decision means has decided that said engine speed variation is caused consecutively in said one of said cylinders of said internal combustion engine, for determining an occurrence of misfiring on a basis of a result of a comparison of said engine rotational speed variation amount computed by said engine rotational speed variation amount computing means with said misfire determination value set by said misfire determination value setting means; and second misfire determination means, operative when said decision means has decided that said engine speed variation is not caused consecutively in said one of said cylinders of said internal combustion engine, including first comparing means for comparing a value calculated in accordance with each engine rotational speed variation amount computed by said engine rotational speed variation amount computing means in a current and in immediately preceding cycles, respectively, with a first set value, and second comparing means for comparing a value calculated in accordance with each engine rotational speed variation amount computed by said engine rotational speed variation amount computing means in two immediately preceding cycles, respectively, with a second set value, for determining said occurrence of misfiring of said internal combustion engine on a basis of results of said comparison in said first comparing means and said second comparing means, only when a remarkably large change in said engine rotational speed variation taking place at a time of said occurrence of said misfire is detected in accordance with a pattern of change with time of said engine rotational speed variation amount.

2. A misfiring detecting system for an internal combustion engine having a plurality of cylinders comprising:

engine rotational signal generating means for outputting an engine rotational signal at every predetermined angle of angular displacement during rotation of said internal combustion engine;

engine rotational speed variation amount computing means for computing an engine rotational speed variation amount per ignition on a basis of said engine rotational signal from said engine rotational signal generating means;

misfire determination value setting means for setting a misfire determination value on a basis of an operating condition of said internal combustion engine;

decision means for making a decision as to whether an engine speed variation is caused consecutively in one of said plurality of cylinders of said internal combustion engine;

first misfire determination means, operative when said decision means has decided that said engine speed variation is caused consecutively in said one of said cylinders of said internal combustion engine, for determining an occurrence of misfiring on a basis of a result of a comparison of said engine rotational speed variation amount computed by said engine rotational speed variation amount computing means with said misfire determination value set by said misfire determination value setting means; and second misfire determination means, operative when said decision means has decided that said engine speed variation is not caused consecutively in said one of said cylinders of said internal combustion engine, including first comparing means for comparing a value calculated in accordance with each engine rotational speed variation amount computed by each engine rotational speed variation amount computing means in a current and in immediately preceding cycles, respectively, with a first set value, and second comparing means for comparing a value calculated in accordance with each engine rotational speed variation amount computed by said engine rotational speed variation amount computing means in two immediately preceding cycles, respectively, with a second set value, for determining said occurrence of misfiring of said internal combustion engine on a basis of results of comparison in said first comparing means and said second comparing means, when said decision means has decided that said engine rotational speed variation is not caused consecutively in said one of said cylinders of said internal combustion engine;

said second misfire determination means being activated when said first misfire determination means has determined said occurrence of misfiring in said internal combustion engine, and, when said decision means has decided that said engine rotational speed variation is caused consecutively in said one of said cylinders of said internal combustion engine, said second misfire determination means changing said first and second set values so as to determine said occurrence of misfiring in said internal combustion engine.

3. A misfiring detecting system for an internal combustion engine having a plurality of cylinders comprising:

engine rotational signal generating means for outputting an engine rotational signal at every predetermined angle of angular displacement during rotation of said internal combustion engine;

engine rotational speed variation amount computing means for computing an engine rotational speed variation amount per ignition on a basis of said engine rotational signal from said engine rotational signal generating means;

misfire determination value setting means for setting a misfire determination value on a basis of an operating condition of said internal combustion engine;

decision means for making a decision as to whether an engine speed variation is caused consecutively in one of said plurality of cylinders of said internal combustion engine;

first misfire determination means, operative when said decision means has decided that said engine speed variation is caused consecutively in said one of said cylinders of said internal combustion engine, for determining an occurrence of misfiring on a basis of a result of a comparison of said engine rotational speed variation amount computed by said engine rotational speed variation amount computing means with said misfire determination value set by said misfire determination value setting means; and second misfire determination means, operative when said decision means has decided that said engine speed variation is not caused consecutively in said same cylinder of said internal combustion engine, including first comparing means for comparing a value calculated in accordance with each engine rotational speed variation amount computed by said engine rotational speed variation amount computing means in a current and in immediately preceding cycles, respectively, with a first set value, and second comparing means for comparing a value calculated in accordance with each engine rotational speed variation amount computed by said engine rotational speed variation amount computing means in two immediately preceding cycles, respectively, with a second set value, for determining said occurrence of misfiring of said internal combustion engine on a basis of results of comparison in said first comparing means and said second comparing means, when said decision means has decided that said engine rotational speed variation is not caused consecutively in said one of said cylinders of said internal combustion engine;

said first comparing means comparing a ratio of engine rotational speed variation amounts computed by said engine rotational speed variation amount computing means in said current and said immediately preceding cycles, respectively, with said first set value; and said second comparing means comparing a ratio of engine rotational speed variation amounts computed by said engine rotational speed variation amount computing means at two immediately preceding cycles, respectively, with said second set value.

4. A misfiring detecting system for an internal combustion engine having a plurality of cylinders comprising:

engine rotational signal generating means for outputting an engine rotational signal at every predetermined angle of angular displacement during rotation of said internal combustion engine;

engine rotational speed variation amount computing means for computing an engine rotational speed variation amount per ignition on a basis of said engine rotational signal from said engine rotational signal generating means;

misfire determination value setting means for setting a misfire determination value on a basis of an operating condition of said internal combustion engine;

decision means for making a decision as to whether an engine speed variation is caused consecutively in one of said plurality cylinders of said internal combustion engine;

first misfire determination means, operative when said decision means has decided that said engine speed variation is caused consecutively in said one of said cylinders of said internal combustion engine, for determining an occurrence of misfiring on a basis of a result of a comparison of said engine rotational speed variation amount computed by said engine rotational speed variation amount computing means with said misfire determination value set by said misfire determination value setting means; and second misfire determination means, operative when said decision means has decided that said engine speed variation is not caused consecutively in said one of said cylinders of said internal combustion engine, including first comparing means for comparing a value calculated in accordance with each engine rotational speed variation amount computed by said engine rotational speed variation amount computing means in a current and in immediately preceding cycles, respectively, with a first set value, and second comparing means for comparing a value calculated in accordance with each engine rotational speed variation amounts computed by said engine rotational speed variation amount computing means in two immediately preceding cycles, respectively, with a second set value, for determining said occurrence of misfiring of said internal combustion engine on a basis of results of comparison in said first comparing means and said second comparing means, when said decision means has decided that said engine rotational speed variation is not caused consecutively in said one of said cylinders of said internal combustion engine;

said first comparing means comparing a difference between engine rotational speed variation amounts computed by said engine rotational speed variation amount computing means in said current and said immediately preceding cycles, respectively, with said first set value; and said second comparing means comparing a difference between engine rotational speed variation amounts computed by said engine rotational speed variation amount computing means in two immediately preceding cycles, respectively, with said second set value.

5. A misfiring detecting system for an internal combustion engine as set forth in claim 2, further comprising:

engine rotational speed variation detecting means for determining whether engine rotational speed variations are caused in said plurality of cylinders before and after a cylinder in which said occurrence of misfiring is currently checked;

said second misfire determination means changing said first and second set values when said engine rotational speed variation detecting means has determined that said engine rotational speed variations are caused in said cylinders before and after said cylinder in which said occurrence of misfiring is currently checked.

6. A misfiring detecting system for an internal combustion engine as set forth in claim 2, wherein:

said decision means includes misfiring cylinder detecting means for detecting a combination of cylinders for which rotational speed variations are occurring consecutively; and said second misfire determination means changes said first and second set values in accordance with said combination of cylinders detected by said misfiring cylinder detecting means when said decision means has decided that said rotational speed variations are occurring consecutively for said same cylinder of the internal combustion engine.

7. A misfiring detecting system for an internal combustion engine having a plurality of cylinders comprising:

engine rotational signal generating means for outputting an engine rotational signal at every predetermined angle of angular displacement during rotation of said internal combustion engine;

engine rotational speed variation amount computing means for computing an engine rotational speed variation amount per ignition on a basis of said engine rotational signal from said engine rotational signal generating means;

misfire determination value setting means for setting a misfire determination value on a basis of an operating condition of said internal combustion engine;

first misfire determination means for determining an occurrence of misfiring on a basis of a result of a comparison of engine rotational speed variation amounts computed by said engine rotational speed variation amount computing means with said misfire determination value set by said misfire determination value setting means; and second misfire determination means, including first comparing means for comparing a ratio of said engine rotational speed variation amounts computed by said engine rotational speed variation amount computing means in current and immediately preceding cycles, respectively, to a first set value, and second comparing means for comparing a ratio of said engine rotational speed variation amounts computed by said engine rotational speed variation amount computing means in two immediately preceding cycles, respectively, with a second set value, for determining said occurrence of misfiring of said internal combustion engine, by determining an engine rotational speed variation amount pattern at a time of said occurrence of misfiring on a basis of results of said comparison in said first comparing means and said second comparing means, only when a remarkably large change in said engine rotational speed variation taking place at a time of said occurrence of said misfire is detected in accordance with a pattern of change with time of said engine rotational speed variation amount.

8. A misfiring detecting system for an internal combustion engine comprising having a plurality of cylinders:

misfire determination means for determining an occurrence of misfiring when a rotational speed variation amount of said internal combustion engine is greater than a first determination value;

a counter for providing a count of a number of occurrences that said rotational speed variation amount of said internal combustion engine falls between said first determination value and a second determination value smaller than said first determination value; and misfire determination invalidating means for invalidating said determination of said occurrence of said misfire by said misfire determination means when said count of said counter is greater than a predetermined value.

9. A misfiring detecting system for an internal combustion engine comprising having a plurality of cylinders:

engine rotational speed detecting means for detecting a rotational speed of said internal combustion engine;

measured value computing means for arithmetically obtaining a measured value by measuring a time period elapsed during an angular displacement between predetermined angular positions in an expansion stroke of each cylinder on a basis of said engine rotational speed of said internal combustion engine detected by said engine rotational speed detecting means;

first engine rotational speed variation amount computing means for computing a first engine rotational speed variation amount by obtaining a difference between measured values of two cylinders, whose expansion strokes occur sequentially, on a basis of results of said measured value obtained by said measured value computing means;

second engine rotational speed variation amount computing means for computing a second engine rotational speed variation amount by obtaining a difference between said first engine rotational speed variation amount computed currently by said first engine rotational speed variation amount computing means and said first engine rotational speed variation amount computed precedently on a basis of information from said engine rotational speed detecting means and said measured value computing means;

misfire detecting means for detecting said occurrence of misfiring of said internal combustion engine on a basis of said first engine rotational speed variation amount and said second engine rotational speed variation amount; and inhibiting means for inhibiting detection of said occurrence of misfiring by said misfire detecting means for a predetermined period until an influence of an engine rotational speed variation due to a preceding misfire on detection of a subsequent misfire disappears, upon detection of said occurrence of said preceding misfire by said misfire detecting means.

10. A misfiring detecting system for an internal combustion engine as set forth in claim 9, further comprising:

sequential misfire detecting means for detecting sequential misfiring occurring in said internal combustion engine; and inhibition release means for releasing inhibition of said detection of misfiring while said sequential misfiring is being detected by said sequential misfire detecting means.

11. A misfiring detecting system for an internal combustion engine as set forth in claim 9, further comprising inhibition delay means for stopping inhibition of said detection of misfiring by said inhibiting means for a predetermined period of time from a time of said occurrence of said misfiring to a time of generation of a rotational speed variation of said internal combustion engine which has an influence on said misfire detection.

12. A misfiring detecting system for an internal combustion engine as set forth in claim 9, further comprising:

inhibiting period setting means for setting a predetermined inhibiting period of time for inhibiting said detection of misfiring by said inhibiting means; and vehicle speed detecting means for detecting a vehicle speed;

said inhibiting period setting means setting said inhibiting period of time to be longer as said vehicle speed detected by said vehicle speed detecting means decreases.

13. A misfiring detecting system as set forth in claim 9, further comprising:

inhibiting period setting means for setting a predetermined inhibiting period of time for inhibiting said detection of misfiring by said inhibiting means; and transmission gear position detecting means for detecting a transmission gear position of an engine power transmission;

said inhibiting period setting means setting said inhibiting period of time to be longer when said transmission gear is at a lower speed position.

14. A misfiring detecting system as set forth in claim 9, further comprising:

inhibiting period setting means for setting a predetermined inhibiting period of time for inhibiting said detection of misfiring by said inhibiting means; and engine load detecting means for detecting a load on said internal combustion engine;

said inhibiting period setting means setting said inhibiting period of time to be longer as said load detected by said engine load detecting means becomes larger.

15. A misfiring detecting system as set forth in claim 9, further comprising:

inhibiting period setting means for setting a predetermined inhibiting period of time for inhibiting said detection of misfiring by said inhibiting means, said inhibiting period setting means setting said inhibiting period of time to be longer as said engine rotational speed detected by said engine rotational speed detecting means becomes higher.

16. A misfiring detecting system as set forth in claim 9, further comprising:

inhibiting period setting means for setting a predetermined inhibiting period of time for inhibiting said detection of misfiring by said inhibiting means; and lock-up state detecting means for determining whether a torque converter for transmitting an output of said internal combustion engines to an automatic power transmission is in a lock-up state to directly transmit an output of said internal combustion engine to said automatic power transmission via a lock-up clutch;

said inhibiting period setting means setting said inhibiting period of time to be longer when said torque converter transmits said output of said engine to said automatic power transmission directly via said lock-up clutch.

17. A misfiring detecting system for an internal combustion engine as set forth in claim 13, wherein said transmission gear position detecting means detects said transmission gear position on a basis of said engine rotational speed of said internal combustion engine and said vehicle speed.

* * * * *